United States Patent [19]

Ring et al.

[11] Patent Number: 5,856,378
[45] Date of Patent: Jan. 5, 1999

[54] POWDER COATING COMPOSITIONS

[75] Inventors: John Ring, Newcastle upon Tyne; Stephen Paul Cassidy, Cleveland; Andrew George Cordiner, Newcastle upon Type; Andrew Robert Morgan, Tyne and Wear; Timothy Marc Handyside, Newcastle on Type; John David Sinclair-Day, Type and Wear, all of Great Britain

[73] Assignee: Courtaulds Coatings (Holdings) Limited, London, England

[21] Appl. No.: 254,220

[22] Filed: Jun. 6, 1994

Related U.S. Application Data

[63] Continuation-in-part of Ser. No. 955,734, Jan. 29, 1993, Pat. No. 5,470,893, and a continuation-in-part of Ser. No. 687,901, Jul. 25, 1991, Pat. No. 5,319,001.

[30] Foreign Application Priority Data

Jun. 1, 1990 [GB] United Kingdom ............. 9012315
May 31, 1991 [WO] WIPO ............. PCT/GB91/00868

[51] Int. Cl.$^6$ ............................................. C08K 7/00
[52] U.S. Cl. .................. 523/205; 523/220; 523/335; 523/340; 524/515; 524/904; 428/407
[58] Field of Search ..................... 524/904, 515; 523/335, 205, 340, 220; 428/407

[56] References Cited

U.S. PATENT DOCUMENTS

| Re. 28,361 | 3/1975 | Hahn | 428/407 |
|---|---|---|---|
| 3,843,571 | 10/1974 | Fitzgerald | 523/220 |
| 3,867,480 | 2/1975 | Fujiyoshi et al. | 260/873 |
| 3,909,282 | 9/1975 | Gray | 106/288 |
| 3,939,114 | 2/1976 | Camelon et al. | 260/42.14 |
| 3,941,904 | 3/1976 | Hoh et al. | 427/207 |
| 3,972,844 | 8/1976 | Morowawa et al. | 260/16 |
| 3,980,607 | 9/1976 | Johannes | 260/37 EP |
| 4,138,511 | 2/1979 | Rolles et al. | 428/403 |
| 4,169,737 | 10/1979 | Burke, Jr. et al. | 523/201 |
| 4,200,566 | 4/1980 | Fitzgerald et al. | 523/221 |
| 4,242,253 | 12/1980 | Yallourakis | 260/40 TN |
| 4,260,066 | 4/1981 | Hannon et al. | 215/12 R |
| 4,268,549 | 5/1981 | Fink et al. | 524/523 |
| 4,312,795 | 1/1982 | Taguchi et al. | 524/904 |
| 4,543,313 | 9/1985 | Mahabadi et al. | 430/109 |
| 5,034,432 | 7/1991 | Ueno et al. | 523/206 |
| 5,196,471 | 3/1993 | Rangaswamy et al. | 523/204 |

FOREIGN PATENT DOCUMENTS

| 0 250 183 | 12/1987 | European Pat. Off. . | |
|---|---|---|---|
| 312331 | 9/1989 | European Pat. Off. . | |
| 0 372 860 | 6/1990 | European Pat. Off. . | |
| 372958 | 6/1990 | European Pat. Off. . | |
| 389080 | 6/1990 | European Pat. Off. . | |
| 2245744 | 5/1975 | France . | |
| 2 190 874 | 12/1976 | France . | |
| 2 310 394 | 12/1976 | France . | |
| 2 147 653 | 4/1973 | Germany . | |
| 2549406 | 5/1976 | Germany | 524/904 |
| 48-7686 | 4/1973 | Japan . | |
| 48-7492 | 7/1973 | Japan . | |
| 1383602 | 12/1973 | United Kingdom . | |
| 1377780 | 8/1974 | United Kingdom . | |
| 1387791 | 9/1975 | United Kingdom . | |
| 1485388 | 8/1977 | United Kingdom . | |
| 1512495 | 7/1978 | United Kingdom . | |
| 2026506 | 6/1980 | United Kingdom . | |
| 2 226 824 | 7/1990 | United Kingdom . | |
| 91/01798 | 2/1991 | WIPO . | |

OTHER PUBLICATIONS

Greenhalgh, W., Plymer Paint & Colour Jounral, Sep. 19, 1979, p. 920.

Carter, K.S., Polymer Paint & Colour Journal, Nov. 12, 1986, vol. 176, No. 4179.

Bine, Thermoset Powder Coatings, ed. J. Ward, FMJ International Publications Ltd., 1989, vol. 161, No. 4008, pp. 26–28.

*Primary Examiner*—Andrew E. C. Merriam
*Attorney, Agent, or Firm*—Pennie & Edmonds

[57] ABSTRACT

A powder coating composition, suitable for providing a coating having certain appearance or performance attributes, which includes composite particles that are agglomerates of individual particulate components fused or bonded together into composite particles such that the composite particles are air-fluidizable and can be applied to a substrate by electrostatic spray without causing the individual particles in the composite particles to break down under the mechanical and/or electrostatic forces associated with their application to a substrate.

20 Claims, 12 Drawing Sheets

STANDARD POWDER
(a)

NON-FUSED MIXTURE
(b)

FUSED AGGLOMERATE
(c)

POWDER COATING COMPOSITIONS

CROSS REFERENCE TO RELATED APPLICATION

This application is a continuation-in-part of application Ser. No. 07/955,734 filed Jan. 29, 1993, now U.S. Pat. No. 5,470,893, and of application Ser. No. 07/687,901 filed Jul. 25, 1991, now U.S. Pat. No. 5,319,001.

FIELD OF THE INVENTION

This invention relates to powder coatings.

Powder coatings generally comprise a solid film-forming resin, usually with one or more pigments. They can be thermoplastic but are more usually thermosetting, incorporating two co-reactive film-forming resins or incorporating a curing agent for the film-forming resin in the powder particles.

Powder coatings are generally prepared by intimately mixing the ingredients, for example in an extruder at a temperature above the softening point of the film-forming resin but below the curing temperature of the composition (the process of extrusion), and comminuting the mixture to the desired particle size in suitable grinding equipment (the process of micronising).

As well as the film-forming resin, and usually the pigment (s), the ingredients generally include other conventional additives such as filler/extender, curing agent, catalyst, degassing agent, melt flow additive, wax, etc. A homogeneous mixture is formed in the extruder and the powder particles formed subsequently contain all the ingredients of that mixture.

The powder may be applied to the substrate by various means, for example by the use of fluid beds, or most commonly by electrostatic spray gun, and ideally the particle size distribution required for most commercial electrostatic spray apparatus is between 10 and 120 µm, with a mean particle size by volume within the range of 15–75 µm. (All mean particle sizes quoted herein are by volume.) Generally, the powders have at least 90% by volume of particles between 20 µm and 100 µm and no more than 70% <50 µm, and have a mean particle size at least 35 µm, and generally no more than 60 µm, often in the range of from 35 to 55 µm, usually 35 to 50 µm. In the electrostatic spray process the powder coating particles are electrostatically charged and the charged particles are attracted to the substrate which is earthed or oppositely charged. The powder coating which does not adhere to the substrate can be recovered for re-use, so that powder coatings are economical in use of ingredients as well as non-polluting to the environment.

The powder is then cured on the substrate by the application of heat (the process of stoving), usually for a period of from 5 to 30 minutes and usually at a temperature in the range of from 150° to 220° C., although temperatures down to 120° C. may be used for some resins, especially epoxy resins; the powder particles melt and flow and a film is formed.

The function of coatings is of course protective, but appearance is also important, and the film-forming resin and other ingredients are selected so as to provide the desired performance and appearance characteristics.

Thus, for example, in relation to appearance, as well as differently coloured coatings, various different aesthetic finishes, for example reduced gloss and textured finishes, may be obtained.

In relation to performance, coatings should generally be durable and exhibit good weatherability, stain or dirt resistance, chemical or solvent resistance and/or corrosion resistance, as well as good mechanical properties, e.g. hardness, flexibility or resistance to mechanical impact; the precise characteristics required will depend on the intended use.

The composition must, of course, be capable of forming a coherent film on the substrate, and good flow and levelling of the composition on the substrate are required, as well as good fluidity of the powder for purposes of application to the substrate. This fluidity of powders is governed by their particle size, and particle size also controls the application efficiency of a powder; powders with small particles, i.e. significant quantities <10 microns, more especially <5 microns, exhibit poor fluidity and application characteristics. In general, powders having a mean particle size below about 15 microns behave as cohesive non-aeratable, or non-fluidisable, powders and are incapable of application by electrostatic spray apparatus, which explains the higher mean sizes employed in powder coating technology.

BACKGROUND OF THE INVENTION

One disadvantage of powder coating compositions is that it is difficult to produce small batches of any particular shade rapidly. When the individual powder particles are applied to the substrate surface they remain as discrete entities. With the application of heat these individual particles melt and coalesce, but do not intermix, even when subsequently fused to give a cured film. The effect of this is that if one were to mix red and white powders and apply them, the resultant film would be a red and white speckled film, not a pink one.

The implications of this for the powder manufacturer are many-fold. Firstly, changing from one coloured powder to another, or from one type of powder to another, presents more difficulties than changing liquid paints. The major problem is the avoidance of contamination of one coloured powder by another. This contamination manifests itself as coloured specks in the finished film since, as explained, the colours of finished powders do not blend as wet paints do.

Also, because of the problem of cleaning equipment, small batches of radically different colours are avoided by the manufacturer with large plant which is capable of servicing the large-volume user. Moreover, using conventional powder coatings, it is not possible, for example, to tint a batch.

Improvements in pigment dispersion techniques have made available fluid concentrated colour dispersions which can be added to a range of colourless or white paint bases to prepare liquid paint rapidly in any shade desired, avoiding the need for a paint store to keep several different types of paint each in a wide variety of shades. Such concentrated colour dispersions cannot, however, readily be mixed into powder coatings.

There is therefore a need for a process whereby powder coatings can be rapidly supplied in a wide variety of shades without the need to store all the different shades.

There is also a need for a means of producing a full range of matt finishes applicable to all powder coating compositions. Conventionally, reduction of gloss in powder coatings from full gloss (80–90% measured at a 60° viewing angle) to some other lower level, for example satin gloss (55–65% gloss) or matt (<30% gloss), is achieved by creating a surface which is rough on a microscopic scale. This surface roughness must be sufficient to cause a reduction in the specular reflection from the film by scattering the incident light; if it is visible, however, a texturing effect is achieved in the film. In liquid paints this gloss reduction is usually achieved by the use of pigment and/or filler particles at high volume concentrations. However, this technique cannot be used as the sole route to gloss reduction in powder coatings as a high content of filler particles would lead to too reduced a surface flow during curing.

The procedure used is to set up reactions within the curing film such that two different gelation rates are set up within the curing matrix. With acid-functional polyesters, a fast gelling (reacting) powder and a slow gelling powder may be manufactured separately and mixed after the micronising stage or, more usually, the components are mixed prior to micronising. The faster gelling domains form particles which disrupt the surface flow of the slower gelling portion of the matrix. For production simplicity and economics, a one-component matt is preferred, but the production of an adequate range of matt finishes using a one-component system is not possible in all resin types, and there is no single matting agent that can be used with all resin types to provide a wide variation of gloss levels.

For texture, there are a wide number of agents that can be added to powders to achieve different surface effects, acting by disrupting the flow of the polymer film. For a stippled finish, micronised PTFE (polytetrafluoroethylene) is used. For a wrinkle finish, cellulose acetate butyrate resin (CAB) or acrylate homo- and copolymers may be used; an example of the latter is Acronal 4F (Trade Mark), which is usually added before extrusion as a flow aid, but which in micronised form is used for texturing. For a hammer finish (gross surface depressions), a metallic pigment and texturing agent are used. In addition, texturing agents based on high molecular weight thermoplastics are commonly added to thermoset powder coatings, giving rise to uniformly poor flow across the surface which manifests itself as a texture.

PTFE is preferably added to the premix before extrusion and is fully incorporated into the extrudate in order to minimise product variation through segregation. However, the micronised PTFE has to be prepared in a particular fashion to give batch-to-batch consistency. CAB may be added to the finished powder or, since as a post-additive it is prone to segregation with use, preferably at the premix stage. It does not melt in the extruder, and the inhomogeneous dispersion thereby produced gives rise to the texture. Some texturing agents, however, for example Acronal 4F (T.M.), have to be added post-extrusion since the extrusion process would render them ineffective by mixing them intimately with the continuous phase of the coating system. Powders containing post-additives are susceptible to segregation which causes inconsistency in the texturing effect on application of the powder. There is a need for a powder coating composition giving a textured finish which avoids these problems.

In relation to performance, often a mixture of different film-forming resins is used to provide the desired combination of durability and mechanical properties, or two coatings are applied separately; preferred, however, would be the use of a single coating composition that segregates to provide an enrichment of one polymer having the better durability at the surface of the coating and one having the better mechanical properties near the substrate. Multilayer coatings may be produced using mixed polymer systems by stratification or "surface segregation" of incompatible phases during film formation. Mixtures of, for example, an acrylic polymer and polyester may be used to form a multilayer coating, with the acrylic polymer migrating to the surface of the coating (the air interface) and the polyester forming the lower layer on the substrate. As compared with pure polyesters, the multilayer coating provides improved stain, solvent and UV resistance, for example resistance to degradation by sunlight, and improved durability and weathering performance, and, as compared with pure acrylic, improved mechanical performance.

If powders are made by pre-mixing both the polymers prior to extruding, however, the stratification is not uniform from formulation to formulation or from colour to colour, such that the improvements described cannot be guaranteed. If, alternatively, acrylic and polyester powder coating powders are mixed prior to application, stratification can be complicated by the formation of textured films due to the incompatibility of the two polymer systems. The two powders will also be subject to problems of segregation of the powders in the solid state. There is a need for segregating compositions avoiding these problems.

PRIOR ART

Metallic pigments such as, for example, aluminium or 'gold bronze' flakes are used in powder coating to add lustre to the coating finish; the most common metallic pigment used is aluminium. In a "leafing" system, the aluminium flakes orient themselves in a continuous layer at or near the surface of the film, producing an opaque silver finish. The pigments are usually incorporated by dry blending; a lustre effect, achieved by the pigment "leafing", for example, may easily be destroyed by strong shear forces, such as those found in extruders and micronisers.

For example, U.S. Pat. No. 3,843,571 relates to a "metallic glamour" finish applied as a powder coating comprising particles having a particle size distribution 1 to 75 microns, that is passing 200-mesh U.S. Sieve. The powder coating compositions comprise 95.0 to 99.9% by weight powder particles of at least two different colours capable of adhering to one another to form a continuous film when heated to their melt temperature, mixed with 0.1 to 5.0% by weight reflective flakes. The coloured particles consist of 70 to 99.9% by weight film-forming binder and 0.1 to 30% by weight colorant particles, and are such that when the powder particles are formed into a film about 50 microns thick the film transmits at least 10% of the light of the visible wave length of 4000–7000 Angstroms. The film is not opaque, but translucent, and has a two-tone appearance.

However, since the metallic flake is simply dry blended in, not added prior to extrusion, the loose metallic flakes in such processes can cause unwanted electrical discharge within the spray gun, and the presence of free metallic pigments within the powder(s) also represents a significant increase in explosion hazard.

These problems have been overcome by a special technique developed by Wolstenholme Bronze Powders Ltd. The technique involves a mechanofusion or bonding of the individual flakes of metallic pigment to the surface of conventional (fluidisable) powder coating particles; as soon as the powder begins to melt during stoving the metallic flakes are released and rise to the surface with the powder coating film, thereby producing a good leafing effect and a bright metallic finish. A range of hammer and other textured metallic finishes can be produced by using, in addition, an appropriate hammer or structure additive. In the review "Ten Years of Bonded Metallic Powder Coatings" by Keith S. Carter in Polymers Paint Colour Journal, Volume 176, No. 4179, November 1986, the author indicates that, although the bonding process is used mainly with flaky metallic pigments, other pigments such as pearlescent pigments— which, like metallic pigments, should not be extruded and ground, and which give a special finish—can also be successfully bonded. However, the technique has not previously been applied beyond the specific field of metallic or lustre finishes, and nor have there been any suggestions to do so.

A number of other powder coating processes using combinations of separate components have also been proposed, generally with the aim of reducing blocking (clumping) in the powder on storage.

U.S. Pat. No. 4,260,066 (Celanese Corporation) describes powder coatings in which small tacky particles comprising a melt flow modifier and adhesion promoter are adhered to non-tacky particles containing a thermoplastic elastomer, melt flow modifier, adhesion promoter and stabiliser, to form composite particles which do not agglomerate on storage. The non-tacky solid is dry blended with the tacky particles and comminuted, generally at a temperature less than about −30° C.

Pending applications EP 0 250 183 A, EP 0 372 958 A and EP 0 389 080 A (Nippon Paint Company Limited) describe the addition of, respectively, cross-linked polymer particles (usually microparticles), an anisotropic crystalline polymer (usually in the form of microparticles), and microparticles of comparatively high Tg to a base resin at any stage of preparation. The components may, for example, be added during the mixing, milling, pulverising or sieving steps or, in a wet process, may be dispersed together in an appropriate solvent or may be combined in the subsequent spray-drying step.

SUMMARY OF THE INVENTION

The present invention is based on the realisation that formation of a fused or bonded agglomerate provides a suitable means for the flexible production of coloured powder coating compositions and for the satisfactory production of matt and textured coatings, and indeed allows for the introduction of a variety of additives into powder coating compositions, both in single layer and multilayer systems.

Accordingly, the present invention provides a composition suitable for application as a powder coating and which is in the form of a fused agglomerate of different particulate components, with the exception of the bonded metallic powder coatings described above.

More especially, the present invention provides a powder coating composition, suitable for providing a coating having certain appearance or performance attributes, which comprises composite particles formed by the agglomeration of individual particulate components fused or bonded together into composite particles such that the composite particles are air-fluidisable and can be applied to a substrate by electrostatic spray without causing the individual particles in said composite particles to break down under the mechanical and/or electrostatic forces associated with their application to a substrate, wherein said individual particulate components comprise a first, solid, film-forming component and one or more additional, solid, components that differ from said first component, each particle of said first component comprising a solid polymeric binder system at least a portion of which is a film-forming resin in an amount sufficient to impart film-forming properties to the composition, the particles of said additional component(s) containing at least one substance that provides, together with said first, film-forming, component, said certain appearance or performance attribute to said coating when processed into a coating with said first component, the identities, particle sizes and proportions of the components in the composition being selected such that, when the composition is applied to a substrate and heated to form a continuous coating, a film having the certain appearance or performance attribute is formed, with the proviso that, if the additional component is a metallic or lustre appearance component and said first component is fluidisable, the powder coating composition also contains at least a non-film-forming performance component or a film-forming appearance or performance component that is incompatible with said first film-forming component.

The agglomerates may, for example, be prepared by mechanofusion of a mixture of the individual components, for example by mechanofusion at a temperature in the range of from 60° to 80° C., to produce composite particles that constitute a free-flowing and fluidisable powder which can be applied by conventional means. Agglomeration prevents segregation of the constituents during application and handling, which otherwise would occur, for example during the application process itself (because of differential electrostatic charging) or in the attendant recovery and recycling process (because of differences in particle size and/or particle density) or in transport, causing batch-to-batch variability in the resulting coating. The composite particles may be likened to raspberries with the individual particles of the raspberry (the drupels) bonded to one another, although the "drupels" are likely to be of different sizes, and there will of course also be "raspberries" of different composition and different sizes in the powder as a whole.

This contrasts with the Nippon Paint and Celanese Corporation compositions mentioned above, where the second component is used to affect the properties of the powder prior to its application to the substrate and so is merely admixed with the first component and is not firmly fixed or bonded thereto; particles of such compositions will be held together merely by hydrogen bonding or van der Waals forces, not by a physical bond, and would be readily separable by the forces encountered, for example, in an electrostatic spray.

BRIEF DESCRIPTION OF THE DRAWINGS

In the accompanying drawings.

DETAILED DESCRIPTION OF THE INVENTION

Powder coating compositions of the invention have a number of uses and advantages:

(i) Firstly, the agglomerates can provide an alternative, and more flexible, means of obtaining a range of coloured powders—and hence of coloured coatings—than conventional extruder mixing. Thus, for example, when differently coloured components are used and the particles thereof are sufficiently small-sized the agglomerate produced from the mixed colours gives a homogeneous appearance (a single colour) when applied to a substrate.

(ii) Secondly, fused or bonded agglomerated compositions allow a permanent fixing in the composition for known materials which would be prone to segregation in the solid state during the handling process, for example in transportation and application, and during recycling of over-sprayed particles.

Thus, more especially, the invention has led to the production of gloss-reduced and textured coatings which do not have the disadvantages described above of conventional such coatings, and allows the development of a flexible mixing scheme to produce a range of aesthetic effects, combining colour, a range of gloss or matt finishes and texture.

(iii) Thirdly, with mixed polymer systems the use of agglomerated compositions of the invention facilitates enhancement or manipulation of segregation (stratification) within the film during film formation.

This has led to the production of more satisfactory multilayer coatings that do not have the above-mentioned disadvantages of the prior art systems.

(iv) Fourthly, incorporation of additives by agglomeration, rather than extrusion, provides the potential for the preparation of a variety of new products which could not be manufactured by conventional routes (e.g. extrusion and micronising), for example because the additive would be damaged by the manufacturing process, or would be likely itself to damage the process equipment.

Figure 1:
FIG. 1 is a electron microscope photograph of a conventional powder coating composition.
Figure 2A:
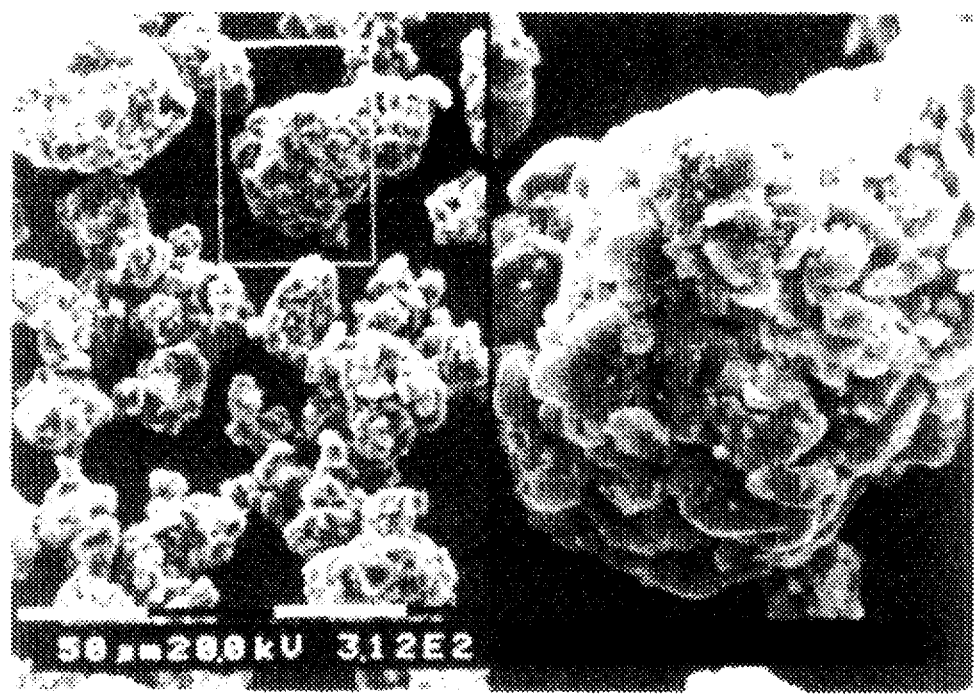
FIGS. 2A and 2B show electron microscope photographs of a fused agglomerated powder coating composition according to the invention.
Figure 2B:
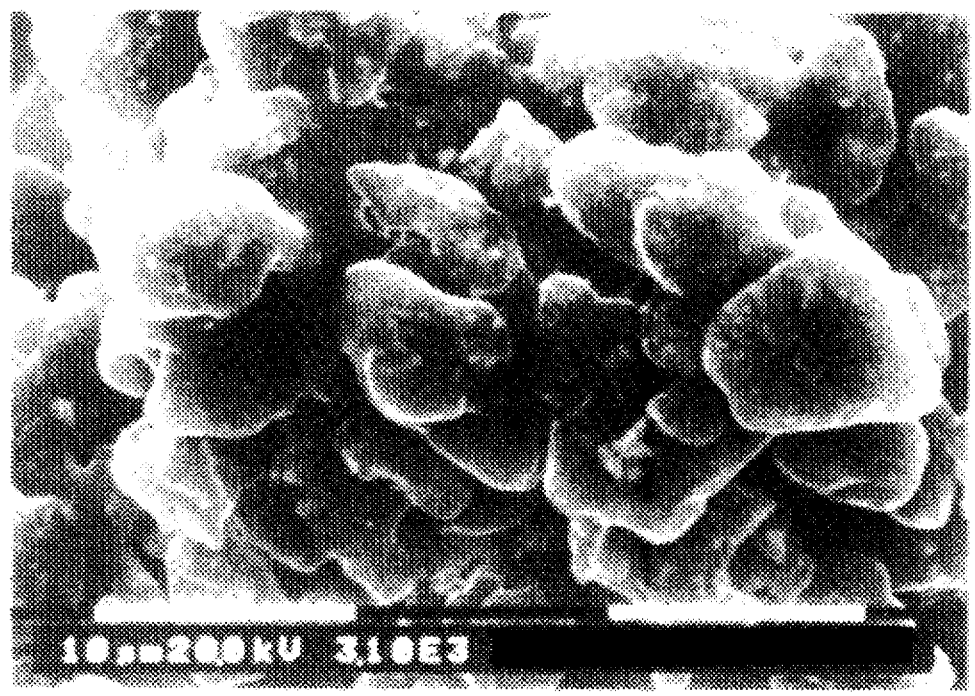

Inspection of a fused agglomerated powder of the present invention under an electron microscope shows that one particle is bonded to another and that the individual particles in the composites are more rounded than prior to agglomeration. When a conventional powder coating composition is inspected under an electron microscope, however, the powder particles are seen to be sharp-edged or angular, and are seen as separate, distinct particles—they are not fused to one another. Thus, as can be seen from comparison of FIGS. 1 and 2 (where the size of magnification is shown by each of the white or black scale bars) a fused agglomerated composition of the invention is essentially different from a conventional powder.

Figure 3:
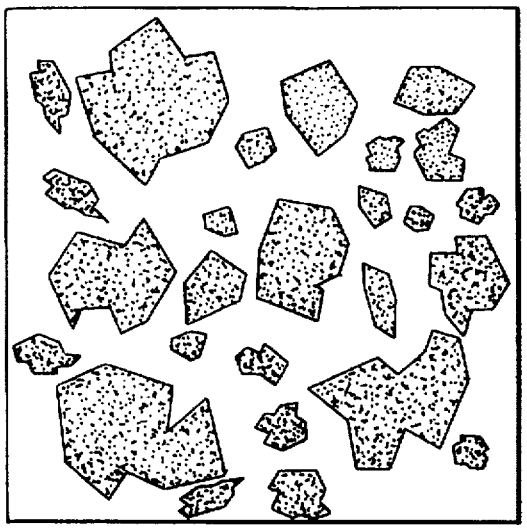
FIG. 3 is a two-dimensional schematic diagram (magnified) of (a) a standard (conventional) powder, (b) a non-fused mixture of powders (drawn to a larger scale than (a)), and (c) a fused agglomerate of the present invention (drawn to the scale of (b))
Figure 3:
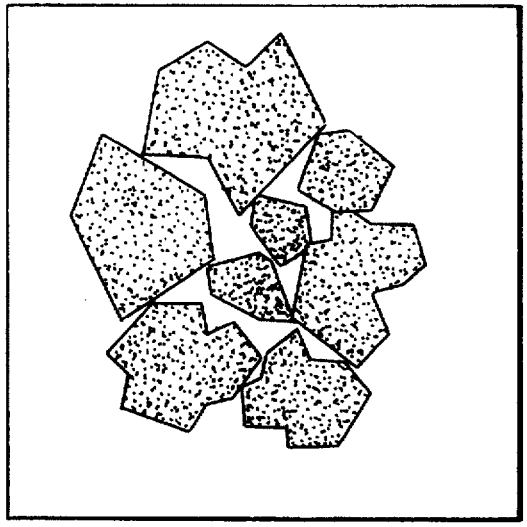
Figure 3:
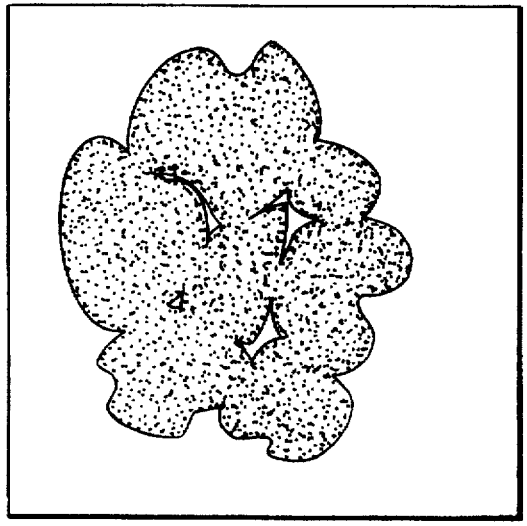

This is also shown schematically in FIG. 3 where (a) shows a section through a standard powder and (c) shows a section through a composite particle of a fused agglomerate; the composite particle comprises a number of individual particles, some of which are illustrated in the two-dimensional section, but others are held in the composite in the plane above or below the plane of the page. The fusion or bonding of the individual particles of (c) is clearly evident, but fusion is not evident in the non-fused mixture (b). Powders (a) and (c) are both fluidisable and, therefore, although shown larger, the representative composite particle shown in drawing (c) is roughly comparable in size with a particle of mean particle size from the standard powder shown in (a). More specifically, the scale of the schematic drawing (a) of FIG. 3 differs by a factor of about 10 from those of the schematic drawings (b) and (c), and the mean particle size of (c) is somewhat less than the mean particle size of (a).

Composition of the Agglomerate

The following trademarks are used in the descriptions which follow: ACRONAL is BASF's trademark for acrylic polymers based on butyl acrylate: polyacrylic acid-n-butylene. They can be used as flow aids or as texturing agents. CUREZOL is Anchor Chemical Group's trademark for 2-heptadecylimidazole-based resin curing catalysts. URALAC is Dutch State Mines' trademark for master batches containing carboxy-functional saturated polyester resins and ACRONAL. The polyesters in URALAC are based on terephthalic acid and neopentyl glycol. MODAREZ is Protex France's trademark for polyacrylate polymers.

An agglomerate of the present invention contains one or more film-forming systems (polymeric binder systems) and usually contains also at least one colouring agent. A film-forming system itself comprises a solid film-forming resin and any curing agent required therefor. (By a film-forming resin/polymer we mean one that acts as a binder, that is, that has the capability of wetting pigments and providing cohesive strength between pigment particles and that wets or binds to the substrate, and that melts and flows in the curing/stoving process after application to the substrate to form a homogeneous film.) Usually any colouring agent or agents (pigments and/or dyes) and any curing agent is extruded with the or with one or more of the film-forming resins so that particles formed therefrom comprise a film-forming resin and colouring agent or agents and/or curing agent; generally at least the majority of such particles contain at least one colouring agent. However, any colouring agent and any curing agent may each, if desired, be present as a separate component. There may, if desired, be two or more film-forming components in the agglomerate; each may be coloured or uncoloured.

One or more other additives may, if desired, be contained in the agglomerate; each may be in a film-forming component or as a separate component (a non-film-forming component).

A non-film-forming additive, which may, if desired, be present as a separate component, may be one having an effect on performance (a "performance additive" or "functional additive"), and/or an aesthetic effect (an "aesthetics additive"), usually a visual effect (an "appearance additive"). A performance additive may be one bringing about an effect on the resulting coating and/or on the application process or the curing process.

Any two or more components in the agglomerate may be compatible or incompatible with each other. For example, the agglomerate may comprise two compatible film-forming components, for example of different colour, or one coloured film-forming component and one uncoloured (compatible) film-forming component (used, for example, to provide additional resin content to improve flow); or two incompatible film-forming components, for example of the same colour or one coloured and one uncoloured, and, if desired, a further component which may be compatible with one of the other two components. (For example, the three-component system acrylic, epoxy and polyvinylidene difluoride (PVDF) comprises two phases, the PVDF being "compatible" with the acrylic but not the epoxy.)

If desired, one or more of the film-forming components may contain a non-film-forming additive co-extruded with the film-forming agent. A separate, non-film-forming component may be compatible or incompatible with a film-forming component.

As will be explained in more detail below, the presence of incompatible components or components that generate incompatibility (both film-forming and non-film-forming) may be used to produce gloss reduction and/or texture in the powder coating: they are acting as appearance or aesthetics additives.

The incompatibility during film formation can be achieved, for example, by the use of polymers of different chemistry that are immiscible during agglomeration and during curing. For example, an acrylic component and a polyester, epoxy, polyester-epoxy or polyurethane component are incompatible, and cannot be blended to form a single (stable) phase. Such systems have such different surface tensions that gross defects are caused when one powder "contaminates" the other.

Incompatibility during film formation can also be achieved by using components that are initially miscible (compatible) but that become incompatible during curing. Thus, for example, two systems of similar chemistry and approximately the same gel time are compatible, but components with different gel times are initially compatible but become incompatible as curing (and molecular weight build-up) proceeds.

Materials that are incompatible during film-formation can separate into different phase domains which can give rise to incompatibility effects such as matting. Aside from this, the presence of two materials of different surface tension at the surface of the film and in discrete areas/domains can lead to surface disruption (texturing).

Alternatively, incompatible film-forming components, with different surface tensions, may be used to provide multilayer coatings: in this instance they are acting as performance additives.

Appearance Additives

Additives having an aesthetic effect include, for example, colouring pigments and film-forming resins incorporating such pigments, gloss-reducing additives, texturing agents, and additives to produce lustrous finishes (e.g. metallic and coated mica pigments). Advantageously, these are present as separate components.

A. Differently Coloured Additives

We have found that when a powder coating consisting of different coloured particles is applied to a substrate, each particle retains distinct boundaries even after application to a substrate and heating to form a film. When the largest dimension of the particles of the powder coating composition is sufficiently small, the differences in colour in the cured powder coating arising from the different coloured particles cannot be discerned by the eye, so that the powder coating is perceived to have a uniform colour.

Thus, in one preferred embodiment of the invention, the first, film-forming component is coloured, and the composition includes as additional component(s) a differently coloured film-forming component that is compatible with the first film-forming component, or two or more such components, the size of the particles in each of the film-forming components being sufficiently low that when the powder coating is applied to a substrate and heated to form a continuous coating the differences in colour in the cured powder coating arising from the different coloured and any uncoloured particles cannot be discerned by the human eye.

Thus, in one embodiment, a range of basic coloured powder coating compositions may be produced, conventionally, in a conventional melt extrusion step, and the products are comminuted to a distinctively small particle size, the resulting differently coloured powders then generally being non-fluidisable. A range of other colours can then be produced by mixing and agglomerating these basic coloured powders in the desired proportions. This allows the storage of comparatively few basic coloured powders, which can be mixed to produce any desired shade, easily on demand, and the production of small quantities becomes commercially feasible.

The number of basic colours used will usually be in the range 3 to 10; for example, red, yellow, blue, white and black can be used, optionally with an unpigmented powder coating composition of the same particle size.

Unlike conventional uniformly coloured powder coating compositions that must contain particles of only a single colour (produced by fusion in the melt extruder) powder coating compositions of this embodiment consist of a mixture of differently coloured particles, but nevertheless give the appearance of a single colour on application to a substrate.

In a further particular embodiment, where the first, film-forming component is coloured and fluidisable, the composition includes as additional component(s) at least one component selected from the group consisting of colouring pigments and film-forming components compatible with the first, film-forming, component, each of the additional components being of such a colour and in an amount and of a size sufficiently small that when the composition is applied to a substrate and heated to form a continuous coating the differences in colour in the cured composition arising from the different coloured particles cannot be discerned by the human eye.

In a different embodiment, the first film-forming component is coloured, and the composition includes as additional component(s) a further, differently coloured compatible film-forming component, or two or more such components, the particle sizes of each of the film-forming components being such that when the composition is applied to a substrate and heated to form a continuous coating the differences in colour in the cured composition arising from the different coloured particles can be discerned by the human eye.

B. Gloss-reducing Additives

We have found that a number of additives may be used as separate components in agglomerates of the present invention to reduce gloss.

1. An incompatible film-former; the component may be coloured or uncoloured.
2. A non-film-forming (or non-flowing) polymer, for example PTFE or a cross-linked or high-melting film-former, for example a high melting acrylic such as polymethylmethacrylate (which melts above 200° C.); these are insoluble in the film at the time of film-formation. They may be coloured or uncoloured.
3. Conventional gloss-reducing agents, that is those used for gloss reduction in conventional powder coatings, or extensions of such systems. In general, we believe they act by generating incompatibility in the curing reaction and/or by setting up a differential curing reaction when the coating film is formed. Examples are as follows:
    (i) A second catalyst which will give a much faster gel time than the principal catalyst used to cure the film; examples are the Ciba-Geigy products "XG 125" (zinc N-ethyl-N-phenyl dithiocarbamate) and "XB 3329" (the zinc salt plus a matting wax) that further reduces the gloss level, possibly through incompatibility.
    (ii) For pure epoxy and epoxy-polyester (hybrid) systems, a catalyst which has a chemical structure that causes two rates of gelation on curing; examples are given in GB 1,545,780 and include the Hüls products B55 and B68 which are adducts of pyromellitic acid and 2-phenylimidazaline.
    (iii) For polyurethane systems using hydroxy-functional polyesters cured with an isocyanate (typically isopherone diisocyanate), a hydroxy-functional polyester with a radically different functionality (e.g. a hydroxy-functional polyester with a functionality of 7 added to one with a functionality of 2) and hence a different gel time.
   (3A) An extension of known techniques using, in contrast to conventional technology, a small proportion of an initially compatible film-former having a different gel time from that of the main film-former; for example for acid functional polyesters designed to cure with triglyceryl isocyanurate, a polyester of approximately the same colour, or uncoloured, but with a different functionality and gel time.
4. Inorganic fillers of large particle size, usually up to 30 μm in size.

We have found that clear "incompatible" particles (1) above, of mean particle size <5 μm, or initially compatible particles (3A) above of mean particle size <20 μm having a different functionality from the first film-forming component, fused in an agglomerate with a conventional powder component or with a film-forming component of smaller particle size, for example of mean particle size <5 μm, are very effective in producing reduced-gloss systems of very specific and unusual character (very low gloss, good flow and levelling, and good flexibility).

Thus, for example, when an acrylic component of small particle size is used as the minor component (up to 20% by weight) with a polyester component 90% by volume of particle size <20 μm in a fused agglomerate, matt coatings caused by micro film defects, with very low gloss levels, may be obtained. We have also obtained similar results when the acrylic matting component is replaced by a polyester of different functionality to the first polyester component and is used in amounts up to 40% by weight. In contrast to prior art matting processes, however, which generally use 50:50 non-fused mixtures of same-sized polyesters, in a fused agglomerate we have achieved good gloss reduction with much lower amounts of additive; by using different relative sizes of the components, also, we have obtained an increased matting effect. Typically, gloss in a polyester system can be reduced to about 5% by addition of 12% by weight of acrylic component or to about 13% by addition of 25% of polyester of different functionality. This second component may be uncoloured or, for example, the same colour as the first component. The system can be further manipulated according to polymer choice, gel time, particle size and filler level of the acrylic or other matting component. Co-extrusion of such mixtures of materials would give full-gloss films with, in the case of an acrylic matting component, a degree of stratification of polyester/acrylic through the film. In contrast, using the dry blends of such materials (non-fused) at particle sizes acceptable for electrostatic application gives macro film defects, with, in the case of the acrylic matting component, some stratification giving rise to a higher than expected (relative to weights added) level of acrylic at the surface. The agglomerated material, however, does not suffer from particle segregation in the solid state as will dry-blended product, thus giving uniformity of product even after transportation and spraying, and the non-spangle matt finishes available using this technique have superior mechanical properties to polyester matt coatings produced by conventional techniques. Such an effect is useful for example on non-reflective ceiling applications.

It should, however, be mentioned that when a standard acrylic component is added in very small proportions (e.g. 1%) and well mixed, the effects of incompatibility may not be evident. Similarly, with film-forming components of different gel time and both (or all) of small particle size, the particles are intimately mixed and incompatibility is at such a small scale that incompatibility effects may not be noticeable.

We have also found that the non-film-forming polymer PTFE is an effective gloss reducer in fused agglomerates. For example, additions of as little as 10% by weight give films with gloss at 15% (60° gloss). This effect is believed to be highly dependent on the particle size of the additive. However, the cured films marr easily; for example the film can be polished by rubbing with a fingernail, cloth, etc. We attribute the effect to removal of PTFE at the surface because the additive binds very poorly to the polyester: it is a hard, non-sticky material which does not soften at film-forming temperatures.

Heterogeneous catalysts such as XG 125 and B 55 mentioned above are already used in powder coatings to provide novel effects, for example as matting agents. The catalyst would normally be applied to the milled powder by special techniques, but the agglomeration process of the present invention allows the introduction of a catalyst in a heterogeneous manner.

C. Texturing Agents

Conventional texturing agents may be used in agglomerates of the invention, but preferably in a novel way, as separate components in the agglomerate. These include 1. the non-film-forming polymer PTFE,
2. CAB or other suitable film-forming polymer.

By the agglomeration bonding technique of the present invention, the problems encountered in the prior art with the use of texturing agents are avoided.

Thus, agents used as separate components in fused agglomerates may be able to act as matting and/or texturising agents, depending inter alia on the size of the component. Thus, for example, when the size of the PTFE particles in a gloss-reduced composition is increased and the amount of the PTFE component is decreased, a textured finish is produced.

We have found that textured films containing PTFE are less easily marred than gloss-reduced PTFE-containing systems, possibly because there is more free resin to bind each PTFE particle because there is generally less PTFE present, and the texturing PTFE is at a larger size and requires less binding resin.

A modification of the prior art use of high molecular weight thermoplastic added to a thermosetting system is the use of 3. a high molecular weight film-forming polymer having a softening point lower than extrusion temperature (90° to 150° C.), but higher than agglomeration temperature (preferably 60° to 80° C.).

D. Metallic Pigments

Aluminium and a number of other metals and alloys e.g. stainless steel, copper, tin, bronze and brass (gold is generally too expensive), may be used to produce what are referred to as 'lustre' or 'glamour' finishes. The aluminium pigments are the most widely used today. Leafing systems have already been discussed. Non-leafing aluminium pigments, which orient themselves throughout the coating film, provide aesthetics quite unlike leafing aluminium pigments. They are unique in their ability to project 'flop', polychromatic, and sparkle effects. ('Flop' is the ability to change colour when viewed at different angles. This capability is directly related to flake orientation in the film.)

Mica pigments may also be used; these are thin platelets of the natural mineral mica coated with titanium dioxide and/or iron(III)oxide. The literature claims that the characteristic properties of their flat structure, high refractive index and transparency create effects in transparent media which, due to the multiple reflection of light, match the lustre of pearls or of mother-of-pearl.

Performance Additives

Various performance additives, the majority of these being non-film-forming components, include a number that could not be added in conventional powder coating manufacture. By allowing for the possibility of incorporating additives post-extrusion, the agglomeration bonding process according to the invention leads in many cases to new products. Examples are:

A. Fragile Additives

1. Toughening Agents

Rubber toughening agents are used in the field of composites to prevent crack propagation. In order to be effective they need to have a well-defined size and shape. Extruding or micronising a sample might destroy its morphology and therefore its intrinsic properties, so that in order to maintain the morphology of the rubber toughener it would preferably need to be incorporated by a method other than extrusion. The agglomeration bonding technique of the present invention offers a method of incorporation of rubber tougheners without affecting their morphology. An example is the addition of rubber-like tougheners into acrylic resin systems which are highly durable but mechanically weak.

2. Friction-reducing Additives

Low-friction coatings frequently use polytetrafluoroethylene (PTFE) or nylon spheres. Addition of these type of materials by the agglomeration bonding method allows the materials to be used without risk of damage to their morphology, thus leading to the production of low-friction coatings, not producible by any normal method of powder coating manufacture.

3. Strengthening Agents

Fibres, for example, confer structural strength to composite materials but would not survive extrusion; fibres may also be used to improve conductivity.

4. Microcapsules

Microcapsules carrying a variety of pay loads can be added to liquid paints to bring about different effects. Many work because application of pressure or stress releases the active ingredient. Those used in the liquid paints that may now be used in the powder coating field, as separate components in a fused agglomerate, include bruisable microcapsules containing perfume, bruisable microcapsules containing aggressive solvents, for self-stripping coatings, bruisable microcapsules containing ink, dye or chemical precursor of either, for printing and other marking.

There are also some attractive new ideas in this area. For example, the use of microcapsules containing air, to improve opacity and perhaps cheapen the coatings, microcapsules carrying plasticizer, to aid flow and levelling (and not necessarily only during stoving, perhaps also after impact of the cured film, thus providing a self-healing coating);

microcapsules containing zinc metal, to obtain anticorrosive coatings without the hazards of handling free metal powder;

bruisable microcapsules containing pressure-sensitive adhesives; for example in post-formable coatings stress-induced release of adhesive may improve adhesion at areas of high deformation.

B. Materials Which May Damage or Lead to Blockage of the Extruder

1. Abrasive Materials

A non-slip powder coating incorporating sand as the non-slip medium may have a significant market for such things as ladders, gangways, etc. Other abrasive materials, for example metal carbides, bauxite and certain other solid inorganic material/pigments, may also be used to provide, for example, non-slip coatings, sandpaper or abrasion-resistant coatings. For example, we have found that by including bauxite in a powder formulation, a coating offering substantial abrasive resistance is produced.

As these materials are hard (bauxite extremely so: 9 on Mohs scale) such coatings could not be produced by the conventional method due to the excessive wear which would occur to the internals of extruders. Agglomeration according to the present invention enables this problem to be overcome, leading to the development of a new range of coatings.

In addition, the agglomeration bonding of the present invention can be used to reduce extruder wear that occurs in conventional powder coatings with the use of certain fillers or extenders such as Syenex extenders. Fillers and/or extenders may be used not only, at large particle size, to reduce gloss (see above), but also as a partial replacement for resin, to reduce costs.

2. Catalysts

Catalyst: Highly reactive catalysts and/or high levels of catalysts are desired to achieve either fast cure at the most common stoving temperatures (for example 170°–220° C.) or cure at lower temperatures. However, they would also cause significant cure at extrusion temperatures (usually 90°–140° C.), that is, the composition would have a short gel time even during extrusion, and this could lead to formation of "bits" in the final coating or even blockage of the extruder.

The agglomeration bonding according to the invention avoids the need for extrusion of the catalyst and offers a method of incorporating more reactive catalyst and/or higher than normal levels of catalyst.

C. Heat-sensitive Materials

Highly reactive curing agents/catalysts may be used to create ultra-low-bake coatings (baking at little more than extrusion temperature). This allows very heat-sensitive materials, for example biological materials (e.g. fungicides or enzymes),
intumescent pigments and
thermochromic pigments, to be included by agglomeration. Intumescent-type pigments foam and yield volatiles when heated and may be used for fire-resistance; such materials in fused agglomerates of the present invention may be included to yield heat- or sound-insulating coatings. Thermochromic pigments are also changed by heat, and are used, for example, on the outside of furnaces to monitor hot spots. Such products may also be used in fused agglomerates of the present invention to provide new and useful coating compositions.

Structuring of Products

In some instances it is desirable to structure the product in a particular way. This can provide advantages in terms of storage and application of the product.

D. Tribocharging and Corona-charging Additives

Tribocharging additives are commonly present as free entities in the product, and it is important that they are able to contact the charging surface in the application gun. However, they are known to segregate, causing problems on application. Introduction of this additive in the last stages of agglomeration may fix them to the surface of the product particle. Corona-charging additives might be used more effectively in a similar way.

E. Surface Segregation

Manufacture of the agglomerate in a controlled way also gives us a unique opportunity to control structure in the coating. Our observations suggest that stratification of incompatible phases during film formation is strongly dependent on the initial particle size of the discrete phases.

1. High Exterior-durability Systems

Agglomeration of, for example, mixed reduced-size acrylic and polyester powders not only avoids problems of segregation, in the solid state, which is otherwise bound to occur, but also has been found to enhance stratification of the non-compatible phases in the molten state (with respect to 'extruder assembled' particles). This control of film structure offers enormous scope for new and improved products.

Effective multilayer systems containing the best properties of polyester and acrylic polymers have been sought after for some time. Although there is an underlying thermodynamic driving force to separate the two species so that the acrylic lies on the surface of the film, kinetic barriers and the time constraint of film formation mean that this does not necessarily happen. We believe that use of an agglomerate of the present invention in which the two species start off as reduced-size discrete phases reduces the importance of kinetic barriers.

Other high exterior-durability systems can be devised. Particularly attractive ones use polyvinylidenedifluoride (PVDF). Its use is, however, limited by its poor adhesion to aluminium substrates and it may therefore be co-extruded with acrylic, then reduced in size and assembled in an agglomerate with reduced-sized epoxy, polyester, polyester/epoxy hybrid or polyurethane particles. Stratification of the PVDF/acrylic component over one of these chemistries at the interface provides a one-coat self-priming super-durable system. Alternatively, in some cases PVDF may also be used as film-forming component on its own, for example with epoxy as the other film-forming component; epoxy acts as an adhesion promoter.

2. Silicone Non-stick Substrates and Anti-adhesives

Silicone-type non-stick substances as used in antifouling coatings technology lack good bulk mechanical properties. Stratification of these film-forming components to yield a thin silicone surface film is advantageous for easy-clean domestic appliances. Conversely, it may be desirable to achieve stratification of an 'anti-adhesive' to the underside to yield a peelable coating.

F. Porous Coatings

Powder coatings lack continuous porosity. It is inferred that because of this any effect which relies on transport through the film is denied. This includes the use of inhibitor pigments for anticorrosion, breathable coatings (e.g. for wood) or many forms of controlled-release. One way to increase porosity may be to increase pigment loading—as a separate component—well beyond critical pigment volume concentration. For example, traditional controlled-release $Cu_2O$-based antifoulings characteristically have pigment volume concentration >80%. Manufacture of powder coatings having very high PVC is not presently possible, but introduction of porosity may be enabled by the agglomeration process. A possibility is to use a soluble component, for example sodium chloride or other water-soluble inorganic product, at high levels. After formation of the powder coating the water-soluble product may be dissolved away, leaving pores.

Thus, for example, the additional component(s) is selected especially from the group consisting of (a) film-forming components that differ in composition and/or in particle size from said first film-forming component, for example differing in one or more of colour (including presence or absence of pigment), compatibility, functionality and particle size, (b) non-film-forming performance additives selected, for example, from the group consisting of fragile additives, extruder-blocking or damaging additives, heat-sensitive additives, tribocharging and corona-charging additives, and water-soluble additives, or non-film-forming additives selected from the group consisting of toughening agents, friction-reducing additives, strengthening agents, microcapsules; zinc; sand, metal carbides, bauxite and other abrasive materials; catalysts; biological material, intumescent pigments, thermochromic pigments, and other heat-sensitive materials; tribocharging additives and corona-charging additives; and water-soluble material, and (c) non-film-forming additives selected from the group consisting of non-film-forming polymers, colouring pigments, texturing agents, conventional gloss-reducing agents, and fillers/extenders.

More especially, such compositions preferably include two or more film-forming components differing in colour, the sizes of the particles in each of these components being sufficiently low that when the powder coating is applied to a substrate and heated to form a continuous coating the differences in colour in the cured powder coating arising from coloured and any uncoloured particles cannot be discerned by the human eye.

Thus, we have found that the fusion agglomerates of the present invention can bring about a dramatic increase in flexibility of the traditional powder manufacturing process and promote utilisation of plant. Not only can the concept be applied to the production of different colours, but, for example, gloss-controlling agents, texture agents and any of the above-mentioned other additives may be introduced, for example, at the mixing step for the two coloured components. In essence, formulation is moved further down the production line. This has the advantage of allowing a wide range of products of different appearance (colour, gloss, texture, etc.) to be obtained from a limited number of base colours. The possibility of adjusting pigment or resin content by adding pigment or uncoloured compatible film-forming particles as separate component also assists product flexibility.

Particle Sizes

Size of Agglomerated Particles

The size of the fused agglomerate particles is governed by the powder handling characteristics and powder application process and by the desired thickness of the resulting film.

Firstly, size must be consistent with appropriate bulk behaviour. Both particle size and, to a much lesser extent, density influence whether or not a powder is fluidisable, and in general powders having a mean particle size less than 15 μm are not readily fluidisable, in particular not by commercial electrostatic spray apparatus.

Generally, the agglomerated particles should be fluidisable. A method of measuring the flow properties of a coating powder is that developed at the Verfinstituut TNO (Metal Finishing Journal 1974); the equipment for this method is available as the 'Fluidimeter AS 100'. A standard quantity of powder, 250 g, is placed in a vessel similar to a fluidised bed but which is fitted with a 4 mm nozzle in the wall just above the porous plate. This nozzle is initially closed and air is passed through the vessel at a standard rate of 200 liters/hour. The powder is stirred during fluidisation until the height of the bed stabilises at a constant level, $V_1$, measured in cm. The air supply is switched off, the powder rapidly falls back to the 'at rest' level and the height is again measured, $V_o$. The air supply is then switched on again at the same rate as before and the powder allowed to reach a constant height. The nozzle is then opened for 30 seconds and the powder which runs out is collected and weighed in grams; at least five replicate measurements are made and the average (G) calculated. The flow factor, R, is defined by the formula: $R = G \times V_1 / V_o$. It has been found empirically that this flow factor correlates very well with practical application properties.

| Flow factor, R | Free-flowing properties |
|---|---|
| >180 | very good |
| 140–180 | good |
| 120–140 | acceptable |
| 80–120 | moderate |
| <80 | poor |

Thus, for example, suitable agglomerated powders have flow factor ≧80.

Generally, for a fused agglomerate, particle sizes no more than 1% by volume over 120 μm, for example up to 110 μm, preferably up to 100 μm, but preferably at least 90% by volume more than 5 μm, especially at least 10 μm, should be used. An agglomerate size of up to 150 μm may be appropriate for special purposes, for example for powder coating reinforcing bars in concrete. The mean agglomerate particle size (by volume) generally is no more than 80 μm, for example no more than 75 μm, preferably no more than 60 μm, for example no more than 50 μm, or no more than 40 μm, and generally at least 15 μm, for example at least 20 μm, preferably at least 25 μm. A mean in the range of from 10 to 50 μm should especially be mentioned. Thus, for example, an agglomerate particle size distribution of 0–120 μm, preferably 5–110 μm, more especially 10–100 μm, with a mean particle size (by volume) in the range of from 15–80 μm, preferably 20–75 μm, especially 25–50 μm, may be used. (It should be noted that the particle sizes referred to herein are generally measured by light scattering techniques and measure the maximum dimension of the particle.)

As to the thickness of the resulting film, for many current applications of powder coating technology, with thermosetting resins the film is approximately 50 μm thick, but there are many current applications for powder coatings, and a plurality of film thicknesses are used. For decorative finishes, film thicknesses as low as 20 μm are known, but it is more usual for the film thickness to fall within the range 25–120 μm, with common ranges being 30–80 μm for some applications, and 60–120 μm or, more preferably, 60–100 μm for other applications, while film thicknesses of 80–150 μm are less common, but not rare. For functional coatings, similar ranges are found. However, there are some uses (for example, coatings for oil and gas pipe lines and for concrete reinforcing bars) where film thicknesses of 150–500 μm are common and, for some encapsulation uses, film thickness can be measured in millimeters. In general, however, thinner coatings are cheaper and therefore preferred.

Thus, the size of the agglomerate should generally also be compatible with achieving the minimum suitable film thickness.

Size of Component Particles

The size of the individual components and the size of the agglomerate are clearly inter-related, and the choice of agglomerate and component particle sizes is influenced by the number and identity of components that will be in the agglomerate (and their proportions) as well as, in the case of the components, by the desired size of the agglomerate.

In a 50:50 mixture of two particles, for example, for at least 90% by volume of the particles the maximum particle size may be 20–30 μm, and very often a much smaller size will be appropriate. Once the particle size of one of the components is reduced, the maximum size of another component may be increased.

There may also be particular requirements for the size of individual components, so that often the agglomerate will contain components of different sizes. Compositions in which at least one of the components has a particle size at least 90% by volume <50 μm and especially where at least one of the additional film-forming components has a particle size at least 90% by volume <50 μm should especially be mentioned. Compositions in which at least one of the components has a mean particle size no more than 35 μm are also especially useful.

Colour Mixing

For colour "mixing", that is when two or more differently coloured components are used, a homogeneous colour in the resulting coating is obtained by utilising sufficiently small particle sizes that the difference in colour of individual particles in the resulting coating is not visible to the naked eye. Theoretical considerations put this size at no more than 39 μm for particles present in a perfect mix. In practice, a perfectly ordered mix is currently unachievable, so the particle size is much less.

This critical size is dependent on a number of factors, including the contrast in hue and luminance between the different particles and the ratio of the different coloured particles. Luminance is somewhat more important than hue, so that the critical size is lower for a mixture of black and white particles than for a mixture of different coloured particles of similar luminance. For any pair of coloured powders the critical size is lowest for a 1:1 mixture. The critical size is also very dependent on the nature (randomness) of mixing.

For a 1:1 mixture of black and white particles, the critical size for all the particles is about 2.5 µm for a random mixture. If, however, the mixture is a perfect alternating array of black and white particles, the critical size for all the particles is above 20 µm. The sensitivity of critical size on going to non-perfect mixtures can be accounted for by the statistical probability of the same colour particles lying adjacent to one another.

For random 1:1 mixtures of blue and yellow particles, the critical size is also about 2.5 µm, although this rises to 5.5 µm for 9:1 mixtures of blue and yellow and to 3.3 µm for 1:9 mixtures. For random 1:1 mixtures of red and yellow particles the critical size is 3.5 µm, rising to about 5.0 µm for 9:1 and 1:9 mixtures; mixtures of red and blue particles give similar results. Mixtures of white and yellow particles have a critical size in the range of 10 to 15 µm. Mixtures having three or more coloured components generally have a critical size which is similar to or larger than that of mixtures of two of the components.

For certain combinations of colour, however, satisfactory mixing to produce a homogeneous colour has proved practicable with 25 µm particles, especially when dark shades and shades of similar hue (for example, dark bluey-green and dark greeny-blue) are mixed.

Suitably, for colour mixing, at least 90% by volume of the particles of each component have a particle size $\leq 25$ µm, for example $\leq 22$ µm, advantageously $<20$ µm. Preferably this limit is $\leq 15$ µm, advantageously $\leq 10$ µm, for example $\leq 8$ µm, for example $\leq 5$ µm, and usually for example $\geq 0.5$ µm, advantageously $\geq 2$ µm, preferably $\geq 4$ µm, more especially $\geq 5$ µm, for example substantially 10 µm or substantially 5 µm. 90% by volume of particles in the ranges 0.5–10 µm, 2–5 µm, 5–10 µm, 4–8 µm and 2–8 µm should be mentioned. Components in which at least 75% by volume of the particles have such particle sizes should also be mentioned. Generally, no more than 1% by volume should be above 35 µm and usually all should be below 39 µm.

Thus, for example, for a homogeneous result the particle size of the colour components is advantageously in the range of 0.5 to 15 µm, preferably 5 to 10 µm, or 2 to 5 µm, with the maximum dimension of at least 99% by weight of the particles preferably being in this size range; preferably all the particles have a maximum dimension of 10 µm or below.

Advantageously the mean particle size for the colour components for colour mixing is within the range of from 1.5 to 12 µm, for example 1.5 to 8 µm. However, mean sizes in the range of from 2 to 8 µm, for example 2 to 6 µm, and in the range of from 8 to 12 µm are especially useful. Mean sizes $\geq 3$ µm and $\leq 5$ µm should also be mentioned.

It may be convenient to have available standard batches of individual components, for agglomeration for particular uses as and when required. For example 5 basic colour powder coating compositions may be used, comprising compositions dyed for example cyan, magenta and yellow, and black and white pigmented compositions. It may also for example be desirable to include a grey basic colour powder coating composition to avoid the very low particle sizes needed for mixtures of black and white powder, and/or a green powder composition to avoid the very low particle sizes needed for mixtures of blue and yellow. If there is a large demand for off-white shades it may be preferred for economic reasons to include a white basic colour powder coating composition of relatively large particle size, for example 5 to 15 microns. Even where there is no colour mixing, a coloured component used in preparing fused composite particles may have the above particle size.

Speckled Finishes

Alternatively, a speckled finish may be obtained by mixing particles having a size greater than those discussed above. Thus, according to this embodiment of the present invention, the agglomerate comprises components of reduced-sized particles which are nevertheless large enough that when applied to a substrate they are separately visible in the coating; particle sizes >20 µm should be mentioned. However, the particle size should be such that the resultant agglomerate of two or more such particles is of a suitable size to meet the requirements for application and film thickness. The desired effect is a film constructed of several individual coloured particle types such that a speckled finish is reproducible and resistant to segregation. At present speckled finishes can only be made by dry-blending normal particle-sized finished powders and these are susceptible to segregation on transport and application, due to differences in particle size distributions, particle density or chargeability and they therefore give nonreproducible finishes.

Suitably, for a speckled finish, in each component at least 90% by volume of the particles are $<50$ µm and more than 10% by volume of the particles are $\geq 20$ µm and the mean particle size is in the range of from 15 to 35 µm, more especially 20 to 30 µm, for example substantially 25 µm. Preferably, less than 10% by volume are $<10$ µm.

"Sooty" Powders—Colour Correction

The agglomeration bonding technique of the present invention may also be used for colour tinting or correction of the colour of a batch. Thus, if a ready-made coloured powder is found to be failing a colour specification, it may be corrected by the addition of one or more coloured film-forming components or pigment(s).

In the past, colour correction was carried out by adding dry pigments and re-extruding the powder. The re-extrusion and the increased solids:binder ratio may, however, change the film characteristics. By using a coloured film-forming component or pigment component (or single pigment mass tones) and adding either by an agglomeration method according to the present invention, the solids:binder ratio is not dramatically altered and the additional processing is less severe.

Thus, according to a different embodiment of the present invention, the agglomerate comprises larger-sized (for example, conventionally-sized) coloured film-forming particles and smaller coloured film-forming or pigment particles, for example the reduced-size film-forming particles detailed above for colour mixing, used in amounts preferably of up to 5% by weight, e.g. up to 1% by weight, for example up to 0.5% by weight, more particularly up to 0.3% by weight, to displace the colour of the larger-sized component over a small colour region, this being used for colour tinting or colour correction of a batch. The amount and size of the smaller particles should be such that they are individually not visible in the resulting film. This would allow for correction of colour within a batch without the need for re-extrusion.

Suitably, the larger-sized particles in the agglomerate are more than 10% by volume $\geq 50$ µm, and more usually no more than 70% $<50$ µm, with a mean particle size 15 to 75 µm, more usually 25 to 50 µm, preferably 35 to 50 µm, and the smaller-sized particles are at least 90% by volume $<20$ µm, preferably $<10$ µm. Advantageously, all the smaller component particles are <25 µm and no more than 3% are <1 µm. Advantageously, the mean particle size of this component is up to 12 µm, for example within the range of from 1.5 to 12 µm, for example 2 to 8 µm, preferably 2 to 6 µm or 8 to 12 µm; mean sizes ≧3 µm and ≦5 µm should especially be mentioned.

Size of Other Additives

An agglomerate of the present invention may also include a special non-film-forming additive(s) as detailed above, and these may be 90% by volume ≦30 µm, more especially 20–30 µm, for example substantially 25 µm, in size. Additives with 90% by volume having a size ≦25 µm, or 20–25 µm, should especially be mentioned. The size of the additive (s) is dictated, however, not only by the size requirements for the agglomerate (influenced inter alia by the requirements for the resulting film), but also by their specific identity and function. For example, a particle >10 µm in size may produce a visible effect; generally, at least 90% by volume of the component should be below 10 µm to avoid this. Thus, for example, a large-scale texturing effect may be obtained with sand or other inorganic particles at 90% by volume >10 µm; when an uncoloured compatible film-forming component is used for adjusting resin content, it is preferably >90% by volume <20 µm, more especially >90% <10 µm as for colour mixing, in order to avoid being separately visible in the resulting coating.

Film-forming Components for Matting/texturing or Surface Segregation; Non-film-forming Components for Matting or Texturing As has been mentioned above, a film-forming component that is incompatible during film formation may be used to provide gloss reduction or texture, or (provided it is also initially incompatible) may be used to obtain a multilayer system.

For a matting effect, discrete domains must be present during film-formation. Thus, as indicated above, components should be incompatible with each other during film-formation. For gloss reduction a difference in surface tension is desirable, especially if the domain size is small or if the principal film former is of high molecular weight; for really good results with such systems, and for texturing, a difference in surface tension is probably essential.

With a small domain size, the incompatibility effect achieved generally becomes more pronounced, but with too small a domain size with respect to the wavelength of light, gloss increases.

Incompatible and compatible (but different functionality) film-forming components having a matting effect at a particle size 90% by volume <30 µm, especially <25 µm, and non-film-forming polymers having a texturing effect at a particle size 90% by volume <50 µm, and matting at 90% by volume <25 µm, especially <20 µm, should especially be mentioned.

Film-forming components of similar chemistry but different gel times provide incompatibility during film-formation, and reduction in gloss may be achieved by such means using, for example, a second film-forming component having a different functionality from the first film-forming component and optionally also containing a different catalyst (both of which lead to different gel times). Increased amounts of this second, compatible, film-forming component leads to increased reduction of gloss. Advantageously, the particle size of the second, compatible, film-forming component with the different functionality is 90% by volume <30 µm, e.g. 90% by volume <25 µm, and with a mean particle size preferably <20 µm, advantageously in the range of from 2 to 20 µm, for example in the range of from 8 to 18 µm, e.g. substantially 15 µm.

However, for provision of significant differences in surface tensions, a non-film-forming polymer or a film-forming polymer of different chemistry from the principal film-forming polymer, incompatible therewith before curing, is required. An example of the latter is the use of two different thermosetting polymer components such as polyester and acrylic. When the film-forming components have different surface tensions, segregation occurs and enhances matting, so that there is a greater gloss reduction at the same level of addition of second component, or, for the same effect, the level of addition is less.

The difference in surface tension aids transport of one component to the surface. This component will tend to stratify if the discrete particles start to coalesce, and ultimately a continuous film is produced; whether or not the component coalesces depends on its viscosity and on surface tension: low viscosity and/or low surface tension enhance the tendency to coalesce.

For example, an incompatible film-forming component of relatively small particle size may be used to provide a reduced-gloss finish. The nature of the finish varies according to the size of the first film-forming component and the proportions of components. With a polyester component of conventional size and 10% by volume of reduced sized acrylic component, for example, we have obtained a textured matt finish; with the same sizes, but half the amount of acrylic, a "cracked-ice" effect was obtained, and with 10% by volume of reduced-sized acrylic component and a polyester component also of small particle size, a non-textured matt finish was obtained.

Thus, for example, in one embodiment of the present invention the agglomerate comprises a film-forming component of any particle size, but preferably having at least 90% by volume of particles <20 µm and with a preferred mean particle size in the range of from 1.5 to 12 µm, especially 3 to 5 µm or 8 to 12 µm, and an incompatible film-forming component having at least 90% by volume of particles <20 µm, more especially at least 90% by volume <10 µm, and with a preferred mean particle size in the range of from 1.5 to 12 µm, for example 3 to 5 µm or 8 to 12 µm.

Increases in the quantity of the acrylic component i.e. >10% leads to segregation/stratification of the acrylic component at the air interface as evidenced by increasing gloss. The degree of stratification occurring depends on the particle size of both the polyester and acrylic particles.

We have obtained surface separation when the particle size in each of the two (incompatible) components is larger, and particle sizes approaching the maximum size commensurate with forming a suitable agglomerate should be mentioned.

Multilayer systems, in which in each component at least 90% by volume of the particles are <50 µm and more than 10% by volume of the particles are ≧20 µm and the mean particle size is in the range of from 15 to 35 µm, e.g. 20 to 30 µm, such as substantially 25 µm, should be mentioned.

We have also obtained surface segregation when the incompatible component is of small particle size and especially when both components are of small particle size. Preferably, therefore, for such multilayer systems the second film-forming component (incompatible with the first film-forming component) is 90% by volume <20 µm and has a mean particle size in the range of from 1.5 to 12 µm, and advantageously the first film-forming component is also of this particle size.

Thus, segregating systems in which the incompatible film-forming component has a particle size at least 90% by volume <50 µm and a mean particle size no more than 35 µm should especially be mentioned.

The additive PTFE, a non-film-forming polymer, has been mentioned as a texturing agent and as a gloss-reducing additive (and as a friction-reducing additive). Whether a texturing or a matting result is obtained is influenced by the particle size.

For example, if medium-sized or relatively large particles of PTFE are agglomerated with small or relatively small film-forming particles, or medium-sized particles with medium-sized particles, a textured finish is obtained. Thus, for example, in one embodiment, the PTFE has at least 90% by volume of its particles <50 μm, more than 10% by volume ≧20 μm and a mean particle size in the range of from 15 to 35 μm, and the film-forming component has at least 90% by volume of particles <20 μm, and preferably a mean particle size in the range of from 1.5 to 12 μm, especially 3 to 5 μm or 8 to 12 μm.

However, with smaller particle sizes of the PTFE, the size of the texture is reduced and, when the deformations become sufficiently small, reduced-gloss finishes are obtained.

Similar texturing or gloss-reducing effects at different particle sizes are obtained with CAB, Acronal (Trade Mark) and cross-linked polymers.

Particle Size Distribution Graphs

The above points are illustrated in the exemplified particle size distribution graphs, FIGS. 4 to 7, which are drawn on a logarithmic scale.

Figure 4:
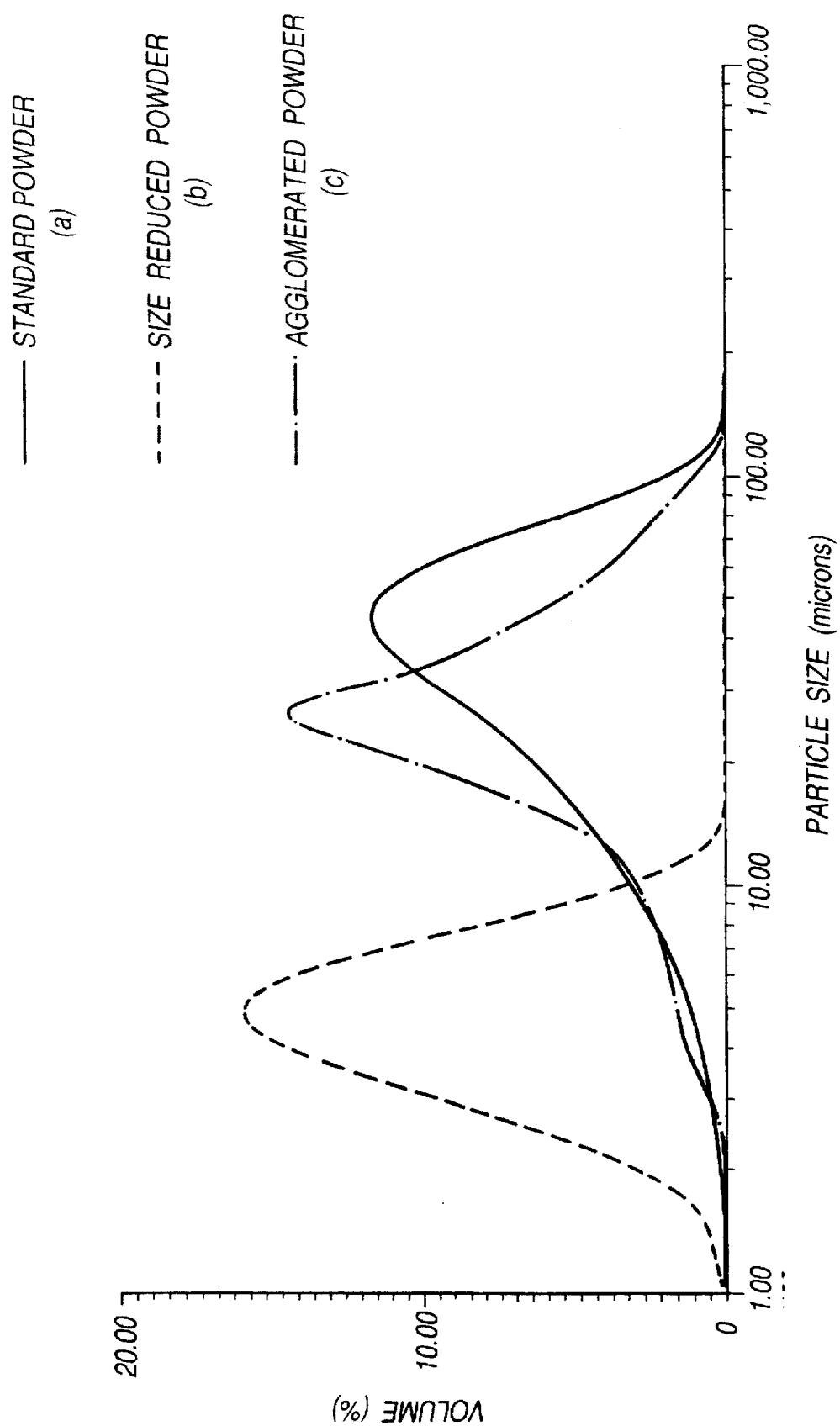
FIG. 4 is a particle size distribution graph, measured by a Galai CIS 1 particle size analyser, of a standard (conventional) powder (a), a size-reduced powder (b) for use as an individual component in the invention, and a powder (c) produced by agglomeration of size-reduced powder (b)

In FIG. 4, the continuous line shows the distribution of particle sizes produced by a standard comminution to give a conventional-sized powder (a), which is fluidisable and suitable for application by electrostatic spray. This "standard powder" has particles ranging in size from less than 1 μm to over 100 μm (and has >10% by volume ≧50 μm, >90% by volume <70 μm, <70% by volume <50 μm) and has a mean particle size in the range of from 35 to 50 μm, in fact a mean of approximately 35 μm. A typical "standard powder" is shown pictorially in FIG. 1.

The dotted line in FIG. 4 represents a powder (b) which has been comminuted further (therefore designated "size-reduced powder") to give a powder suitable for use, for example, in the colour mixing technique described above. The powder illustrated has a mean particle size about 5 μm and a maximum particle size of about 15 μm; well over 90% by volume of the particles are less than 10 μm. The powder is non-fluidisable, but when agglomerated (or when two or more such powders, e.g. two same size but differently coloured powders) are agglomerated, the product (c) becomes fluidisable, having for example a mean particle size of about 25 μm as shown by the broken line in FIG. 4. A typical such agglomerated powder is shown pictorially in FIGS. 2A and 2B.

Figure 5:
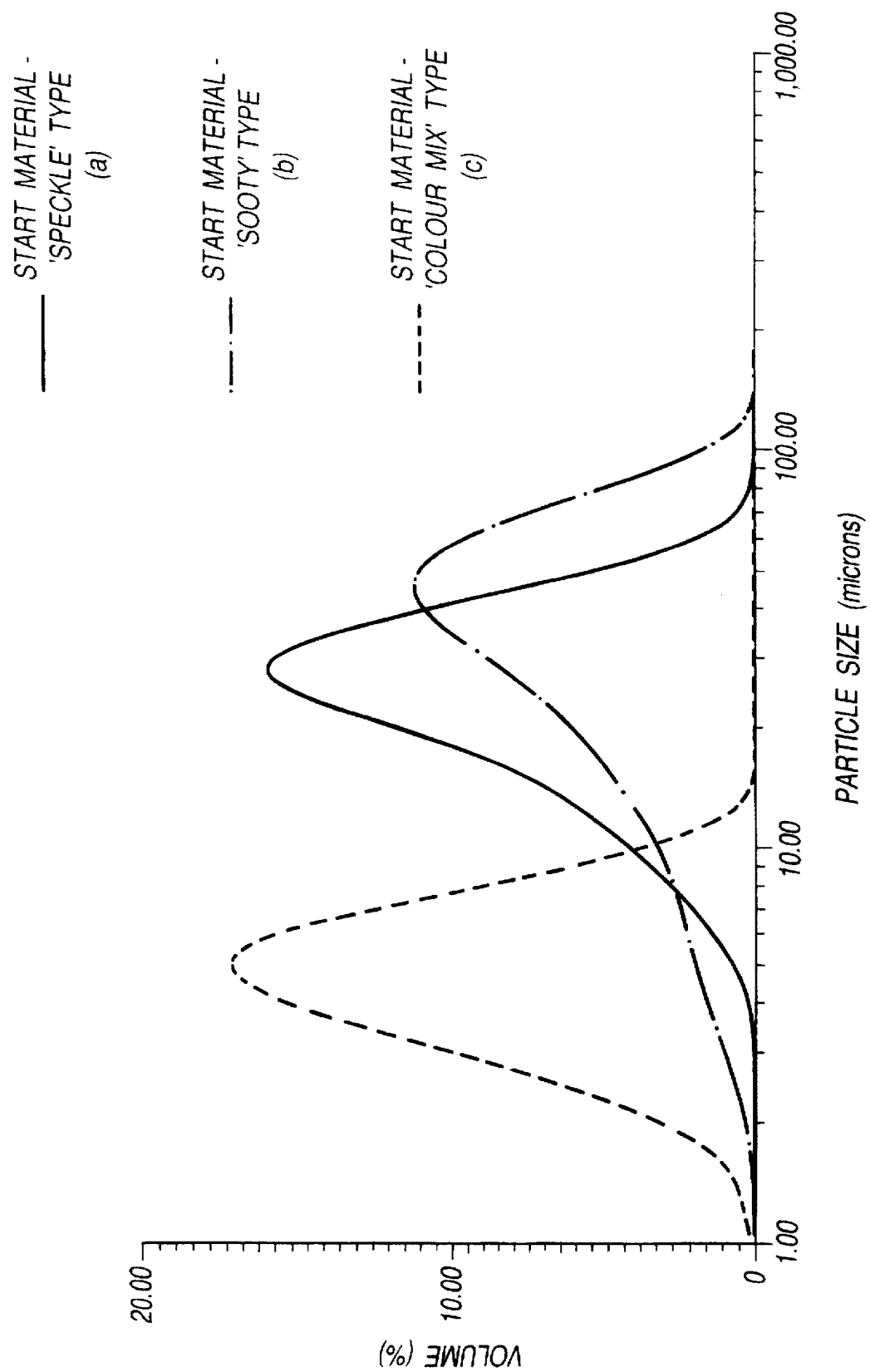
FIG. 5 is a particle size distribution graph of various examples of mixed powders prior to agglomeration, where each of (a) and (c) consists of size-reduced powders having the same particle size distribution and (b) consists of a mixture of a size-reduced powder and a larger-sized powder.

FIG. 5 shows particle size distribution graphs of mixed powders prior to agglomeration. The continuous line shows the particle size distribution of a mixed powder (a) suitable for use in producing, for example, a speckled finish. The powder illustrated, consisting of two differently coloured but same-sized powders, has particles ranging in size from about 2 μm to 110 μm (and has more than 90% by volume less than 50 μm, more than 10% by volume at least 20 μm) and has a mean in the range of from 15 to 35 μm, in fact a mean of approximately 22 μm. Although this mean is significantly less than that of the standard powder of FIG. 4, the powder is still fluidisable. The dotted line shows the particle size distribution of a mixture of size-reduced powders (c) suitable for agglomerating for colour mixing purposes. The powder illustrated consists of differently coloured but same-sized powders and has a particle size distribution shown by the dotted line of FIG. 4. The broken line shows a particle size distribution of a mixture of powders (b) suitable for agglomerating for the colour correction or tinting technique ("Sooty") described above, and consists of 5% of the reduced-size powder (c) and 95% of a standard powder as in FIG. 4, which has been classified to reduce the content of small-sized particles.

Figure 6:
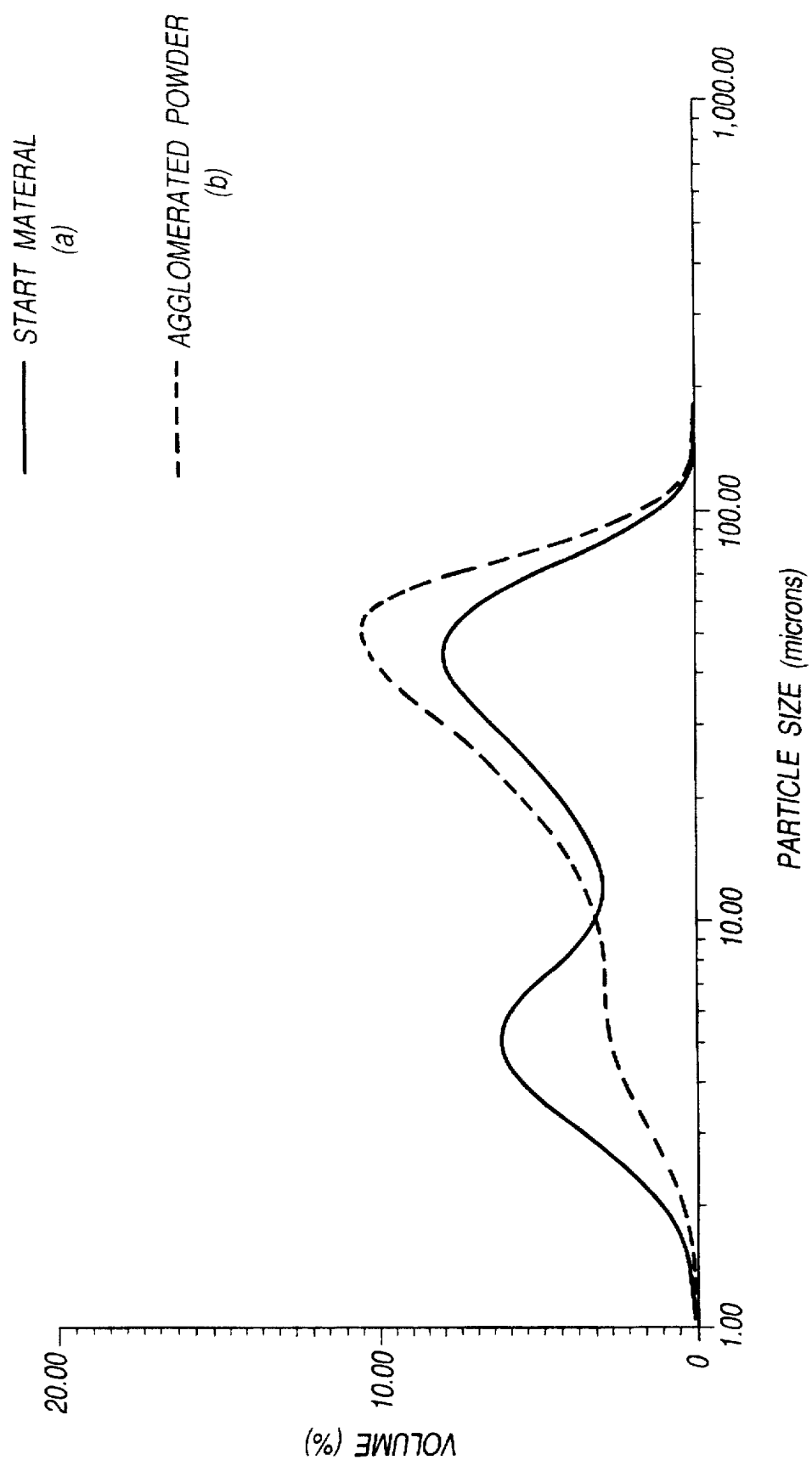
FIGS. 6 and 7 are particle size distribution graphs of non-agglomerated mixtures (a) of powders of standard particle size and reduced particle size, and (b) the same mixtures after agglomeration.
Figure 7:
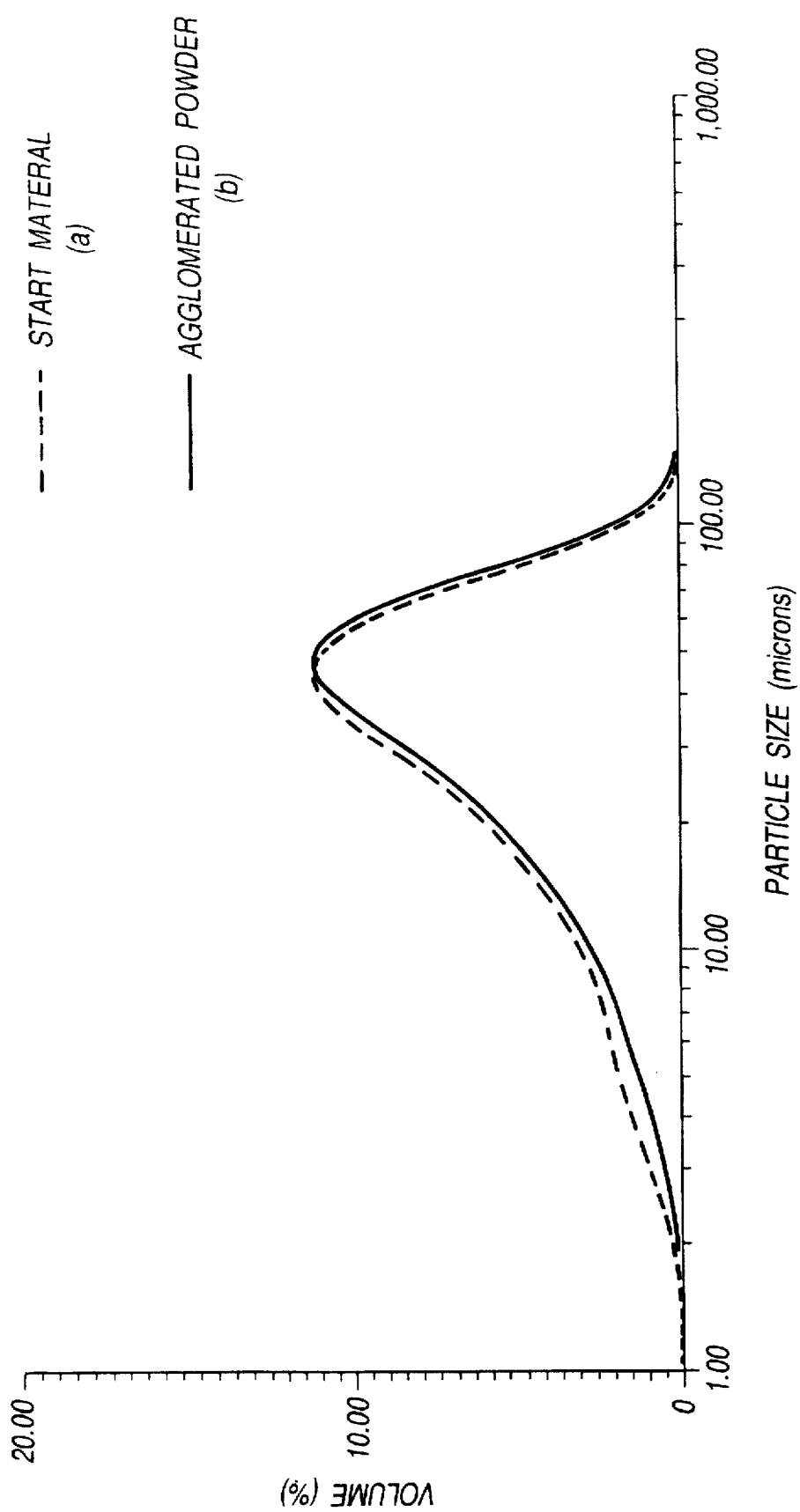
Figure 8:
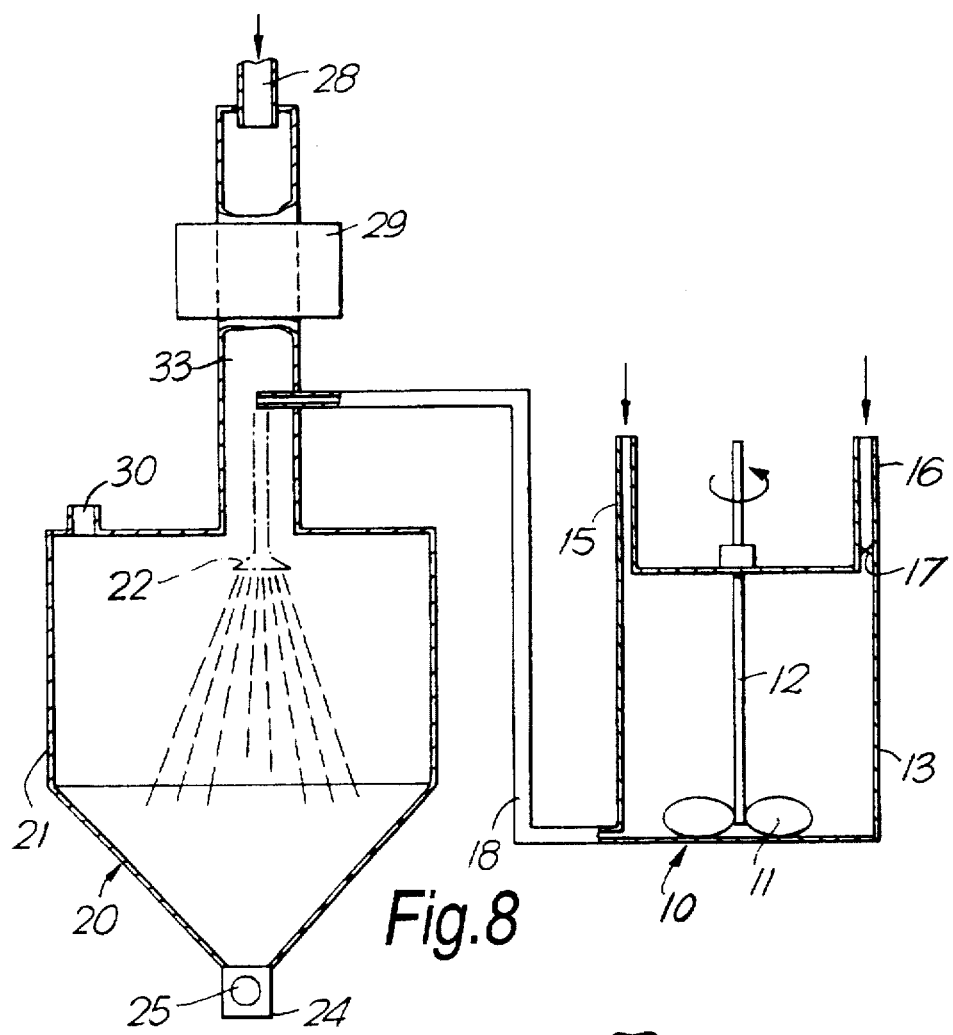
FIG. 8 is a diagrammatic section of an apparatus for producing powder coatings by dispersion and spray-drying.

FIGS. 6 and 7 show the effect of agglomerating a bimodal mixture (a) of powders of standard particle size and of reduced particle size. The illustrative smaller-sized powders of these Figures are non-fluidisable (see (b) of FIG. 4) and are mixed with the standard powder in the proportions 1:2 (FIG. 6) and 5:95 (FIG. 7). The effect of the smaller-sized component on the graph for the pre-agglomerated mixture is shown clearly in FIG. 6, where the mixture contains a higher proportion of the smaller-sized component, but is shown only as a slight shoulder in the graph of FIG. 7 where the mixture contains only 5% of that component. Following agglomeration, the mean particle size of each of the powders (b) is increased. FIG. 7 represents a mixture suitable for agglomerating for the colour tinting technique ("Sooty") as also shown in FIG. 5.

Various Agglomerate Types

In order to assist in understanding the ramifications and the potential of the fused agglomerates of the present invention, conceptual agglomerates composed of several different combinations of component sizes may be mentioned.

(I) The agglomerate comprises a larger-sized film-forming component and one or more smaller-sized components, usually a small-sized or relatively small-sized film-forming or non-film-forming component or two or more components of such a size; an example of such a system is the colour correction system ("Sooty") described above.

(II) The agglomerate comprises two medium-sized components, at least one of which is film-forming, as, for example, in the speckled finish described above; additional small or relatively small-sized components may also be present.

(III) The agglomerate comprises two or more small or relatively small-sized components, at least one of which is film-forming, as in the colour mixing system or matt system using compatible or incompatible film-forming components described above.

(IIIA) The agglomerate comprises a large or medium-sized component and one or more smaller-sized components, at least one of the smaller-sized components being film-forming, as, for example, in the textured finish described above.

More especially, these agglomerate types have particle sizes as follows:

(I) Component (i): more than 10% by vol. ≧50 μm
preferred mean particle size 25–50 μm
Each component (ii): at least 90% by vol. <20 μm
preferred mean particle size 1.5–12 μm (II) Each component: at least 90% by vol. <50 μm more than 10% by vol. ≧20 μm mean particle size 15–35 μm (III) Each component: at least 90% by vol. <20 μm
preferred mean particle size 1.5–12 μm (IIIA) Component (i): moderate size, e.g. at least 90% by vol. <50 μm more than 10% by vol. ≧20 μm mean particle size 15–35 μm, or large-sized Each component (ii): at least 90% by volume <20 μm
preferred mean particle size 1.5–12 μm Type II agglomerates may in addition contain particles of small particle size as defined for type III agglomerates.

The particle size distribution for suitable components in type III agglomerates and small-sized components (ii) in types I and IIIA agglomerates and optional additional component for type II is illustrated by the dotted line in FIGS. 4 and 5. Preferably, such components have particle sizes at least 90% by volume <15 µm, more especially <10 µm, often <2 µm. Usually all particles are <25 µm and, in a film-forming component, a maximum, for example, of 3% by volume may be <1 µm. Preferred mean particle sizes are usually in the range of from 1.5 to 12 µm, for example 1.5 to 8 µm, preferably 2 to 8 µm, for example 2 to 6 µm, more especially 3 to 5 µm, or 8 to 12 µm. Such particle size distributions are especially useful for compatible and non-compatible film-forming matting components. Components having 90% by volume up to 30 µm, especially up to 25 µm and a mean size up to 20 µm should also be mentioned for compatible film-forming components having a different functionality from the first component.

The particle size distribution for suitable components in type II agglomerates and moderate-sized components (i) in type IIIA agglomerates is illustrated by the continuous line in FIG. 5. Preferably, such components have particle sizes at least 90% by volume substantially 25 µm and preferably also less than 10% by volume <10 µm. Preferred mean particle sizes are in the range of from 20 to 30 µm, more especially substantially 25 µm. Large-sized components in type IIIA agglomerates may be of some considerable size, depending on the effect desired; examples are metallic pigments and sand where the additive cannot be size-reduced without loss of function.

The particle size distribution for suitable large-sized components (i) in type I agglomerates is illustrated by the continuous line in FIG. 4. Preferably such components are conventionally-sized powder coating particles. Generally, the components have at least 90% by volume in the range of from 20 to 100 µm and no more than 70% by volume <50 µm, with a mean particle size usually at least 35 µm, for example in the range of from 35 to 60 µm, more often 35 to 55 µm, for example 35 to 50 µm. Alternatively, reduced-sized components may be used, and particle sizes, for example, at least 90% by volume <70 µm, for example at least 90% <60 µm, or at least 90% <50 µm, should be mentioned. Preferred mean particle sizes are in the range of from 25 to 55 µm, more especially, 25 to 50 µm. Thus, for example, the component may be fluidisable alone.

Film-forming components in type II agglomerates or in type III agglomerates preferably have the same or similar particle size distributions to each other.

Fillers and other inert particles used to produce gloss reduction or texturing, texturing agents (e.g. PTFE, CAB, Acronal 4F (Trade Mark)), fibres and, especially metallic pigments and mica, and abrasives (especially sand and metal carbides) usually are relatively large particles, and may therefore be incorporated in agglomerates of type II or type IIIA (where they are the larger-sized component).

The particle sizes quoted for the various grades of mica pigments are 5–20 µm, <15 µm, 10–50 µm, 10–60 µm, 5–100 µm, 30–100 µm, 40–200 µm, 5–50 µm, 10–100 µm. From the data available it would appear that the various grades of aluminium pigments have similar particle sizes to the mica pigments.

The size of those additives giving a texture or hammer finish is influenced by their aesthetic function, and may be, for example, 20–30 µm for CAB used with a metallic pigment to achieve a hammer finish; reduction to a much smaller particle size could adversely affect or even destroy their ability to produce the desired appearance. Other texturing agents are generally conventionally of fine particle size; CAB, Acronal or PTFE, for example, may be used as the smaller component in a type I agglomerate, for example in an amount of <2% by volume, usually about 1% by volume. At larger particle size CAB and Acronal may be used to achieve novel texturing effects.

It should be noted that for a non-slip surface a smooth film is not required, and, whilst covering by the binder is required, projection of part of the sand or other additive above the surface is not only allowable, but desired (removing one constraint on the component size). Particles of some considerable size (e.g. about 150 µm) could be agglomerated provided they were a small proportion of the mixture. In such cases the sand will be the larger-sized component in a type IIIA agglomerate. Sand of rather smaller particle size may of course be used for gloss-reduction or texturing.

Pigments, heterogeneous catalysts, rubber tougheners, catalysts, biological material, intumescent and thermochromic pigments, and tribocharging and corona-charging additives are usually required in only small amounts relative to the film-forming component (for example tribocharging additives may be added at 2% or less, usually 1% or less, catalysts also at 2% or less) and/or are effective at small particle size (for example, rubber tougheners are effective at about 1 µm size). These are therefore usually present in the agglomerate as relatively small particles, and may therefore be incorporated in agglomerates of types I, III and IIIA (where they are a smaller-sized component).

For rubber tougheners, incorporation in a type III agglomerate should especially be mentioned.

Texturing agents such as PTFE, CAB and Acronal, if used as very small particles in, for example, type I and III agglomerates, may have a gloss-reducing effect.

Microcapsules, friction-reducing additives, non-film-forming matting polymers and other gloss-reducing agents, fillers and/or extenders used as partial replacement for resin, silicone non-stick substances and anti-adhesives and water-soluble products for introducing porosity may be used in various particle sizes, and may therefore be incorporated in agglomerates of types I, II, III and IIIA. In type II and IIIA agglomerates fillers and/or extenders will also produce a reduction in gloss as mentioned above.

As an alternative to its use in microcapsules, zinc, which unless encapsulated would cause problems because of its conductivity, may be present as the large component in the type IIIA agglomerate; it is thus effectively encapsulated by the smaller film-forming component.

Friction-reducing additives may range in size, for example, from 1 to 30 µm or more, more especially from 2 to 30 µm. Excellent results have been obtained with particles 25 µm in diameter.

Incorporation of silicone non-stick substances and anti-adhesives in a type II agglomerate and of microcapsules in types I and II agglomerates should especially be mentioned.

The size of sodium chloride or other water-soluble component for the preparation of porous coatings should be chosen carefully, and depends on the size of pores required and on the properties of the coating required, for example water vapour transmission rate, oxygen transmission rate, etc. Types II and III agglomerates should especially be mentioned.

Reference has already been made to the use of epoxy and PVDF systems. The PVDF may be the inner particle in a type IIIA or type I agglomerate, with a very small amount of epoxy; on film-formation some epoxy migrates to the surface, where it degrades quickly, causing a rapid but minor loss of gloss. The remaining epoxy serves to promote adhesion of the PVDF to the substrate, and also assists the charging and charge retention of the powder and its application to the substrate.

The quantity of any performance or aesthetics additive in the agglomerate is dependent on the effect desired and also on the structure of the agglomerate, including the particular sizes of the components.

For example, with a type I agglomerate there may, for example, be on average no more than one layer of small particles per large particle and preferably the large particle should be completely coated. With too large a quantity of additive, the quality of mixing decreases.

Thus, for example, in a type I agglomerate each additive to the larger-sized component may be present in an amount of up to 2% by volume of the total agglomerate. The total amount of such additive(s) may be, for example, up to 30% by volume.

In a type II agglomerate there may be, for example, at least 20%, preferably at least 30%, by volume of each component, and usually 30 to 50% of additive for a two-component system.

In a type III or IIIA agglomerate there may, for example, be up to 30% by volume of non-film-forming component or components in total.

Speckled agglomerates are possible with a type IIIA agglomerate, as well as with a type II agglomerate, and for these and for colour correction with type I agglomerates and type III agglomerates used for colour mixing, the proportions of film-forming components depend on the desired appearance.

Fillers in general should constitute no more than 30% by volume of the agglomerate, preferably no more than 20%, and preferably the filler and pigment together are no more than 30% by volume; usually the filler itself is no more than 5% by volume.

In gloss-reduced systems, non-film-forming polymers in any agglomerate type are suitably up to 20%, preferably up to 10%, for example up to 5% by volume, of the total agglomerate. A coloured or uncoloured compatible film-forming component having different functionality and hence different gel time used as matting base may be up to 40%, preferably up to 25%, more especially up to 15% by weight of the total agglomerate. We have used this component, for example, in an amount of less than 1% by weight to produce a matting effect, to change from a 90% gloss system to an 85% gloss system. Conventional (standard) gloss-reducing additives may also be, for example, up to 10%, for example up to 5%, by volume of the agglomerate.

Similarly, for example, a coloured or uncoloured incompatible film-forming component used as matting base in any agglomerate type may be up to 30%, preferably up to 20%, more especially up to 15% by volume of the total agglomerate, and more especially at least 5% by volume. With <5% by volume of incompatible film-forming component a textured finish may be produced.

With increasing amount of acrylic component, the gloss of a polyester, epoxy, polyester-epoxy or polyurethane film increases because the acrylic component tends to coalesce; the extent of gloss increase/coalescence is a function of the concentration of the component and the speed at which it can reach the surface, itself a function of its initial size and of its surface tension versus viscous drag from the surrounding principal film-forming component.

In a multilayer system, the weight ratios of segregating components may be, for example, 95:5 to 50:50, e.g. from 90:10 to 50:50, advantageously 85:15 to 50:50, especially at least 80:20.

In one especial embodiment of the invention powder particles are an agglomerate of different particulate components fused or bonded together into composite particles, wherein the different particulate components comprise a first film-forming component and a second film-forming or non-film-forming component, more especially a film-forming component incompatible with the first film-forming component or a film-forming component compatible with the first film-forming component but having a different functionality, or a non-film-forming polymer component, the identity, amount and particle size of these components being such that when the powder coating is applied to a substrate and heated to form a continuous coating the components are incompatible and a matting effect is obtained.

In a different embodiment, powder particles are an agglomerate of different particulate components fused or bonded together into composite particles wherein the different particulate components comprise a first film-forming component and a second film-forming component incompatible with the principal film-forming component, the identity, amount and particle size of these components being such that when the powder coating is applied to a substrate and heated to form a continuous coating the two components segregate and form a multilayer system.

Composition of Film-forming Systems

A film-forming resin may be a thermosetting resin or a thermoplastic resin. When a thermosetting resin is used, the solid polymeric binder system generally includes a solid curing agent for the thermosetting resin; alternatively two co-reactive film-forming thermosetting resins may be used.

Except where otherwise required for special effect or result, two or more film-forming components (whether coloured or non-coloured) should have similar melting point, melt viscosity, surface tension and other rheological properties, so that they flow and level to the same extent when the powder coating is applied to a substrate, and except where otherwise required for surface segregation or matting any two or more film-forming components are preferably based on the same binder system, usually of similar composition except for the pigmentation or gel time.

Examples of pigments which may be used in the basic film-forming components or as separate components are inorganic pigments, such as, for example, titanium dioxide white, red and yellow iron oxides, scarlet chrome, chrome yellow and carbon black, and organic pigments such as, for example, phthalocyanine, azo, anthraquinone, thioindigo, isodibenzanthrone, triphendioxane and quinacridone pigments, vat dye pigments and lakes of acid, basic and mordant dyestuffs. Dyes may be used instead of or as well as pigments. Each coloured film-forming component of the coating composition may contain a single colorant (pigment or dye) or may contain more than one colorant.

A pigment content of <40% by weight of the total pigment and filler content (the filler being added to assist opacity, while keeping costs down) may be used. Usually a pigment content of 25–30% is used, although opacity can be obtained with dark colours with <10% by weight of pigment.

The powder coating composition may, for example, be based on a solid polymeric binder system comprising a carboxy-functional polyester film-forming resin used with an epoxy-functional curing agent such as, for example, an epoxy resin, for example a condensed glycidyl ether of bisphenol A, or a low molecular weight tri-functional epoxy compound such as, for example, triglycidyl isocyanurate, or with a beta-hydroxyalkylamide; or a hydroxy-functional polyester used with an isocyanate-functional curing agent; or an epoxy resin used with an amine-functional curing agent such as for example, dicyandimide; or a functional acrylic resin, for example a carboxy-, hydroxy- or epoxy-functional resin, used with an appropriate curing agent. The binder may be a thermoplastic resin such as, for example, a fluoro-resin, for example polyvinylidene fluoride or an ethylene/tetrafluoroethylene copolymer, or poly-phenylene sulphide.

Mixtures of co-extruded film-forming binders may be used; for example a carboxy-functional polyester may be used with a carboxy-functional acrylic resin and a curing agent such as, for example, a beta-hydroxyalkylamide which serves to cure both polymers.

One or more additives such as, for example, a flow-promoting agent, a plasticiser, a stabiliser, for example a stabiliser against UV degradation, or a filler, or two or more such additives may be present in the coating composition, being mixed with a film-forming component(s) before or in the extruder, or present as separate components in the agglomerate. Some additives, however, are unsuitable for co-extruding and must be present as separate components.

Preparation of the Agglomerates

The film-forming component(s) and non-film-forming component(s) where appropriate may be prepared by methods generally known in the production of powder coatings, where appropriate with a final comminution step which produces a low particle size.

In general, the film-forming and non-film-forming particles may be of any shape; for example they need not be spherical. Powders produced by impact milling are generally blocky in shape; fibres, microcapsules, slip and non-slip additives and metallics, however, are generally of specific shape.

The comminution may be carried out, for example, by jet milling in a fluid energy mill. Fluid energy mills function by collision of particles in a high velocity stream of gas, generally air. Particles of diameter less than 5 μm are easily obtained from a feedstock of mean particle size 50 μm. Fluid energy mills have the advantage that the composition is continuously cooled by the gas stream. In an alternative process the individual component, preferably at particle size below 500 μm, may be dispersed in a non-solvent for the ingredients of the component, for example water, and comminuted by techniques known for wet paint, for example in a high speed bead mill or ball mill. Conventional comminuting devices using metal shearing blades are less efficient in producing sub-10 μm particles as it is difficult to prevent fusion of the heat-sensitive powder.

Mixing of the various components may be carried out by various techniques.

A preferred method for mixing film-forming and other particles is dry mixing of the powders in a high-shear mixer. Powders of particle size below 15 μm, for example 0.5 to 10 μm, behave as cohesive non-aeratable powders. Devices containing a high shear chopper, for example, produce satisfactory mixtures of substantially all components of this particle size. High-speed forces may be required to break unwanted agglomerates of particles formed on storage and handling of the components.

A simple example of a suitable high-shear mixer is a modification of the type of food mixer known as a liquidiser. An inlet is arranged in the mixing chamber at about the level of the rotating blade. The inlet is for a high-velocity gas stream, preferably air, to ensure that the powder is kept circulating past the blades. Another example of a suitable high-shear mixer is described in GB Patent 2132128 in which a disintegrator or chopper rotating about the horizontal axis is positioned above a disc rotating about a vertical axis which acts as the main agitator for the mixer. Mixers of this type are sold by Freund Industrial Co. Ltd.

In further examples of suitable high-speed mixers blades of paddles are mounted in a cylinder to rotate about the axis of the cylinder and to scrape the inner surface of the cylinder so that all the powder being mixed is continuously moved around and along the cylinder. The blades may be in the shape of ploughshares to improve mixing of the powder along the length of the cylinder. Chopper blades are mounted about half way along the cylinder to rotate at right angles to the axis of the cylinder. Such mixers are the Herfeld mixer and that sold by Lodige-Morton Machines Ltd. as the 'Lodige Ploughshare' mixer and by Winkworth Engineering Ltd. under the trade name 'RT Mixer'.

Alternatively, comminuting of film-forming component(s) and other component(s), where appropriate, and mixing may be carried out simultaneously by feeding a mixture of components to a comminuting apparatus such as, for example, a fluid energy mill, or by feeding such a mixture in aqueous dispersion to a bead mill or ball mill. There may be problems in cleaning the comminuting apparatus used in this process, particularly if using wet grinding.

In an alternative mixing process the film-forming and other components where appropriate are mixed by an electrostatic mixing technique. In this process a powder component, for example the colour component, is electrically charged and a second component, for example an uncoloured or second colour component, is not charged or is charged to a different potential, and the powders are mixed. For example, one powder may be electrically charged positively and another powder may be electrically charged negatively. Since the charged particles combine with oppositely charged particles or uncharged particles preferentially, electrostatic mixing may produce an agglomerated product approaching a perfect mixture rather than a random mixture, thus, where colour is a factor, allowing higher particle sizes to be used than with other forms of mixing; for example, particle sizes of up to 20 μm for the film-forming powders may be used, even with light and/or dissimilar shades, although particle sizes in the range 1.5 to 10 μm are preferred. The charged particles may be allowed to combine freely or may be mixed in a pulsed electric feed. A suitable apparatus for electrostatic mixing of powders is described by C. L. Tucker and N. P. Suh in 'Polymer Engineering and Science', October 1976, Vol. 16, at pages 657 to 663.

When three or more powders have to be mixed, for example, two coloured powders and an uncoloured powder or three coloured powders, they are preferably mixed sequentially when electrostatic mixing is used. Alternatively the three or more powders may be charged to different potentials and combined in one mixing operation. For example, if three powders are to be mixed, one may be charged positively, one negatively and the third may be uncharged.

Agglomeration to produce a product with fused or bonded composite particles large enough that the material is air-fluidisable and can be applied to the substrate by conventional electrostatic spray, usually 15–100 μm and preferably 25 to 50 μm, may be achieved in a number of ways.

One agglomeration process is granulation in which an added material is used to promote adhesion between the particles.

A granulating agent may be added as a solution, but it is important that the solvent does not affect the coating composition. A preferred solvent for the granulating agent is water. The non-volatile constituents in the granulating agent are preferably compatible with the resin in the coating composition. Thus, for an acrylic-based powder coating, a water-borne acrylic granulating agent can be used, such as, for example, Glascol HA2 obtainable from Allied Colloids Ltd. This granulating agent is also suitable for use with thermosetting polyester powder coatings. The granulating agent for an epoxy-based powder coating may, for example, be a water-based epoxy resin. A water-soluble cellulose ether such as, for example, that sold under the Trade Mark "Celacol M20P" is an alternative granulating agent for polyester, acrylic or epoxy resins. The granulating agent may be in the form of a latex, for example a vinyl or acrylic polymer latex. Typically the amount of granulating agent required is less than 15% by weight, for example 1 to 10%, based on non-volatile solids, to agglomerate powder with a mean particle size 5 μm to yield a product of mean size 40 μm.

Alternatively, a chemically-harmless solvent for the binder may be used as granulating agent. The solvent need not be a good solvent for the film-forming components and is preferably quite volatile to aid extraction after agglomeration. An example is methanol (and many other simple alcohols), CFCs, liquid $CO_2$ and chlorocarbons, especially methylene chloride. Vacuum extraction can be used to aid removal of the solvent after agglomeration.

The granulating agent is preferably introduced as a spray into a mobile mixture. It may for example be so introduced into the apparatus of U.K. Patent 2132128, or into a 'Lodige Ploughshare' or 'Winkworth RT' mixer at a position about half way along the mixing cylinder. When the same machine is used for mixing and agglomerating in this way, dry mixing, if required, should be carried out before addition of the granulating agent. The high-shear chopper is generally not used during granulation, or is used at a much reduced speed. We have found that finely atomised granulating agent allows better control on the product particle size distribution and more efficient use of the granulating agent.

An alternative apparatus which can be used for both mixing and granulating is the 'Spectrum' sold by T. K. Fielder and Co. Ltd. This is of the type having a chopper rotating on a vertical plane above an agitator rotating in a horizontal plane. An aqueous granulating agent may be added after mixing, and the apparatus is equipped with microwave generators of a frequency to heat the water added with the granulating agent, thus drying the granulated product.

In an alternative process for introducing the granulating agent, the granulating agent may be encapsulated in particles of the film-forming resin. An aqueous solution of the granulating agent may be emulsified in a solution of the film-forming resin in an organic solvent, for example a solution of a polyether binder resin in a chlorinated hydrocarbon such as, for example, chloroform. The emulsion is spray-dried to form capsules of the desired particle size, for example 1.5 to 10 μm. These capsules are added to the other component(s) either at the start of mixing or during mixing. The capsules are gradually broken by the shearing forces used in mixing, release the granulating agent solution to cause granulation.

The agglomerated mixture is preferably dried before it is discharged from the mixer to prevent undesired subsequent agglomeration. A drying gas, for example dry air at 25°–80° C., may be passed through the mixer after the granulating agent has been thoroughly mixed into the powder coating composition. The mixing action is preferably continued during drying. Alternatively, the agglomerated mixture may be dried in a fluidised bed dryer after discharge from the mixer.

An alternative method of fusion agglomeration is to use mechanical forces to bind the particles through a process involving deformation and microwelding of the plastic material. A commercially available device for carrying out such mechanical agglomeration is sold as the Nara hybridisation system and described in European Patent Application 224659. Another mechanofusion device is sold by Hosokawa Micron B.V. as an Ang mill. A further apparatus suitable for a mechanofusion agglomeration is a mill having conical and planar dies as described in WO-86/04835. We have shown, for instance, that a material having very broad softening range of 45°–80° C. may be agglomerated using this device.

A further suitable device is the FM10 Henschel mixer. It relies on a vigorous mixing action to heat up the powder, so that the particles are sufficiently softened to bond under relatively mild impact. The FM10 is a 10 liter chamber featuring a single impeller. The speed of rotation is variable, but typically run at 3000 rpm. A thermocouple is located in the mixer chamber to monitor temperature. Typically, 2 Kg of the mixed components are heated to 50°–55° C. within 7 minutes. At this temperature bonding occurs. We have found that it is especially advantageous to provide an external heat source to circulate hot water through the external jacket of the vessel.

Thus, in one embodiment of the agglomeration process using a modified Henschel mixer, the vessel is initially cold and empty, the powders to be mixed are charged to the vessel and stirred at high speed for approximately one minute. The stirrer speed is then reduced to "slow" speed and the hot water passed through the jacket to bring the temperature inside the vessel to 60° C.; at this temperature agglomeration proceeds fairly swiftly. This stage of the operation takes approximately 30 minutes. The rate of agglomeration is, we believe, controlled by the rate of heat-up, but the heat-up rate is influenced by the tendency of the powder to stick to the inside wall of the vessel. The provision of a wall scraper is useful to deal with this problem. Once agglomeration has been achieved, the powder may be cooled and sieved.

When there is prior electrostatic mixing of powders before agglomeration, the mixed particles are agglomerated by the attraction of oppositely charged particles. It is however necessary to supplement this with subsequent more permanent agglomeration, for example by a granulation process or by heat softening.

The components may alternatively be mixed and agglomerated by dispersing them together in a liquid dispersion medium followed by drying of the dispersion under conditions causing fusion agglomeration. The liquid dispersion medium is preferably a non-solvent for substantially all the ingredients of the powder coating composition. Water is the preferred dispersion medium. It may be used alone or with a surfactant or water-miscible organic liquid such as, for example, an alcohol or an ether alcohol.

The mixing apparatus used to form the dispersion may use mechanical means, for example a high-speed mixer which employs a rotating toothed disc to generate high shear forces, or may use ultrasonic dispersion as well as or in addition to the mechanical disperser. For example mixing in a high-speed disperser may be followed by ultrasonic dispersion.

The process used to disperse the composition in the liquid dispersion medium may also serve as the final step in comminuting binder particles of the powder coating composition to the desired particle size, for example to below 10 µm.

The dispersion produced is fed under pressure to the drying apparatus, for example a spray-drying apparatus. Spray-drying may be carried out using a conventional atomising spray head, in which case the diameter of the spray head at its narrowest point is preferably 20–500 µm to achieve fused agglomerated particles of the desired particle size for electrostatic spray, namely 20–50 μm. Spray-drying has the advantage that the particle size of the fused agglomerated powder coating composition produced can be controlled by the concentration of the dispersion and the diameter of the spray head. The spray may alternatively be a centrifugal spray system, for example a spinning disk spray, or may be an ultrasonic spray. The spray dryer is preferably a co-current dryer in which the direction of the spray is generally downwards and in which a stream of gas, generally air, passes down the drying chamber in the same general direction as the spray. This stream of gas is preferably at ambient temperature or above. The inlet temperature of the gas may, for example, be 40°–120° C. The agglomerated powder coating particles produced collect at the bottom of the spray drying chamber and may be removed by a suitable valve system. The vapour of the dispersion medium passes upwards and may be vented. Alternatively the whole output of the spray dryer may be passed to a cyclone separator to isolate the agglomerated powder coating.

When different colours are to be mixed the process of the invention is preferably carried out in conjunction with a data-storage system containing details of the proportions of the colour components required to make powder coating in different shades so that for a given shade and size of batch a data processor can calculate the weight of each colour component to be used. Automatic weighing means may be used if desired. A colour computer may be used if desired to calculate the proportions of colour components required to match a sample of a non-standard shade.

The components may be stored at a reduced particle size, for example below 10 μm, and mixed and agglomerated as required. Alternatively the components may be stored at a high particle size, for example 15 μm or up to 50 μm as conventionally used for coatings, to be comminuted if required, mixed and agglomerated as required.

The most common method for the application of powder is an electrostatic spray gun, and the particle size required for most commercial application equipment is ideally a distribution between 10–120 μm with a mean particle size within the range 15–75 μm, preferably 25–50 μm. In the electrostatic spray process the powder coating particles are electrostatically charged by the Corona cloud surrounding the outlet of the spray gun, this cloud being generated by the electrode within the spray gun itself. The charged particles are attracted to the substrate, which is earthed or oppositely charged. Powder coatings may also be applied using tribostatic guns where the powder particles are electrostatically charged by rubbing against the internal winding of the gun. Another method for the application of powder coatings is the use of fluid beds. In this instance the article to be coated is usually preheated and dipped into the fluid bed of powder, the article is then withdrawn and the powder coating allowed to cure by residual heat or by further baking in an appropriate oven.

The mixing and fusion or bonding agglomeration techniques will be further described by way of example with reference to the accompanying FIGS. 8 to 14.

The apparatus of FIG. 8 generally comprises a mixer indicated generally by the reference numeral 10 and a spray dryer indicated generally by the reference numeral 20. The mixer 10 is a high-speed disperser having an impeller 11 mounted on a shaft 12 within a vessel 13. The vessel 13 has an inlet 15 for the dispersion medium, for example water, and an inlet 16 controlled by a valve 17 for feeding the components. The powder coating particles are dispersed in the dispersion medium and the dispersion thus formed is pumped through an outlet 18 by a pump (not shown) to a spray dryer 20.

The spray dryer 20 comprises a vessel 21 containing a downwardly directed atomising spray head 22. The spray-dried powder coating particles fall to the bottom of the vessel 21 and are removed through an outlet 24 controlled by a valve 25. The vapour of the dispersion medium which is evaporated passes upwards at the side of the vessel 21 and is vented at 30. Air is fed to the dryer 20 through an inlet 28 and passes in through a heater 29 and down a central duct 33, forming a co-current flow of heated air around the spray head 22.

The apparatus of FIG. 9 as shown is suitable for mixing four powders in three mixing steps carried out successively. The apparatus can be adapted to include further mixing steps if required. The apparatus comprises an inlet 41 for a first component whose particles have been positively charged, for example using an apparatus similar to that described in "Polymer Engineering and Science", October 1976, at page 658, and an inlet 42 for a second component whose particles have been negatively charged or are uncharged. The inlet 42 can be sleeved with an insulating material designed to impart a change to the particles by tribocharging. Polytetrafluoroethylene, for example, will induce a negative charge on the particles. The particles mix at the junction 43 of inlets 41 and 42, and the oppositely charged particles combine. The combined particles pass along conduit 46. An inlet 47 for a third component meets conduit 46 at junction 48. The particles of the third powder are preferably oppositely charged to whichever of the first and second powders is present at greater weight, or if the second powder is uncharged the particles of the third composition can be negatively charged. The combined particles and the particles of the third powder combine at junction 48 and pass to conduit 52, where they are combined with particles of a fourth powder component supplied through inlet 53 meeting conduit 52 at junction 54. The fourth powder is charged oppositely to the net charge of the first three powders. The resulting combined particles pass through conduit 55 and can be collected in a suitable container. These may then be granulated to achieve more secure agglomeration.

The apparatus of FIG. 10 comprises three inlets 61, 62 and 63 for first, second and third powders. The inlets all feed a mixing chamber 64. The particles of the first powder component are charged positively; the particles of the second powder component are charged negatively and the particles of the third powder component composition are uncharged. The particles combine in mixing chamber 64 and pass to conduit 65, whence they can be collected in a suitable container.

The apparatus of FIG. 11 is a modified 'Moulinex' (Trade Mark) food blender and comprises a mixing chamber 71 containing a blade 72 extending in two directions and mounted on a spindle 73. The blade can be rotated at high speed by drive motor 74. The blade 72 has a sharp leading edge in the direction of rotation and has an upwardly inclined portion 75 at one side of the blade and a downwardly inclined potion 76 at the other side of the blade. The inclined portions 75 and 76 of the blade 72 are both tapered so that the tips of the blade 72 are sharp points. An inlet 77 for high-velocity air is positioned in the wall of the chamber 71 substantially at the level of the blade 72. The chamber 71 has a cover 78 which retains the powder coating particles but is porous to air. The cover 78 can for example be of sintered thermoplastic material such as polypropylene or of sintered glass. The combined action of rotation of the blade 72 and the high-velocity air keeps all the powder in the mixing chamber 71 in a substantially fluid state and the high shear action of the blade 72 breaks up any powder agglomerates, which tend to fall into the path of rotation of blade 72 because of their greater weight than the non-agglomerated powder particles.

Figure 12:
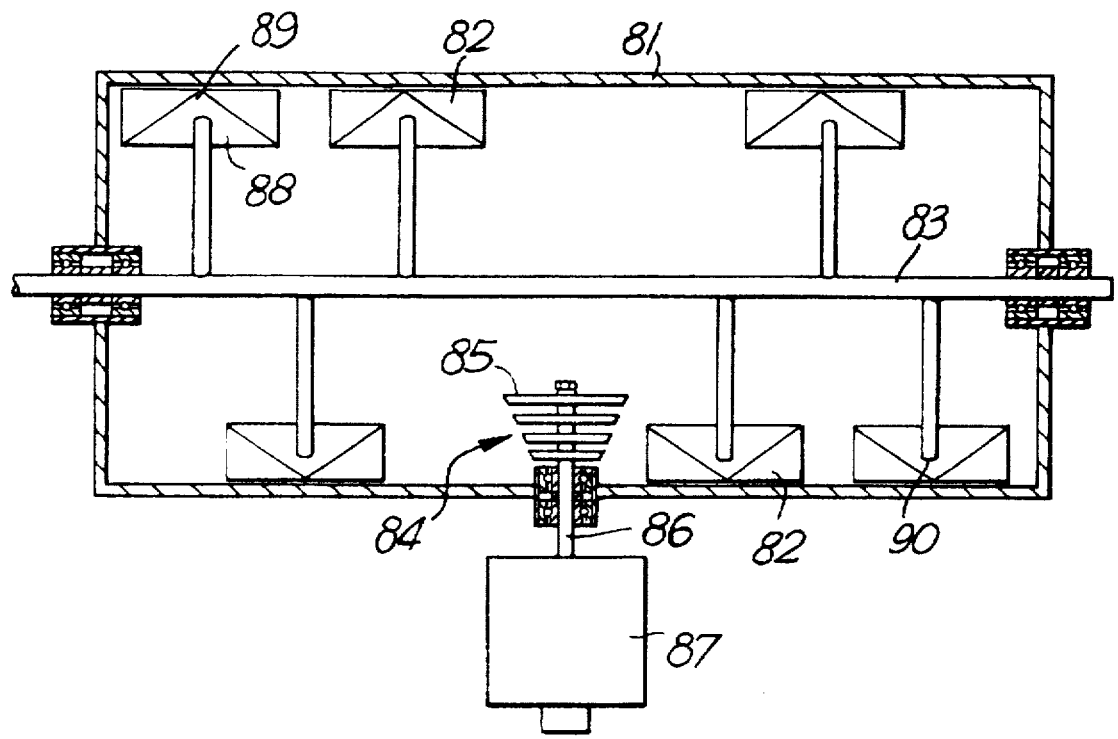
FIG. 12 is a diagrammatic longitudinal section of an alternative mixer for mechanically mixing powdered components.

The apparatus of FIG. 12 comprises a cylindrical mixing chamber 81 containing blades 82 mounted on a drive shaft 83, which in use is rotated by a motor (not shown). A chopper 84 consisting of a set of cutting blades 85 mounted on spindle 86 is situated half way along the mixing chamber 81. The spindle 86 is driven by a motor 87 to rotate the cutting blades 85. The blades 82 are shaped with a leading edge 88 tapered in two dimensions to a point 89 to promote mixing of powders along the chamber 81. The trailing edge 90 of the blades 82 is also tapered but not to a point.

Figure 13:
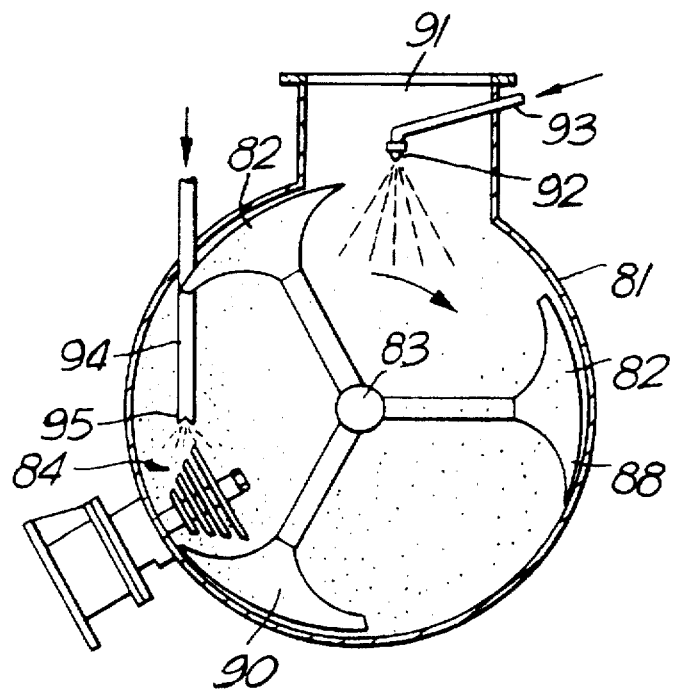
FIG. 13 is a diagrammatic cross-section of the mixer of FIG. 12 adapted to carry out granulation after mixing.

The apparatus of FIG. 13 is a modification of the apparatus of FIG. 12 and the same parts have the same numerals. The apparatus includes two types of inlet for a solution of granulating agent. The mixing chamber 81 is modified to include a top zone 91 within which are located a series of spray heads such as 92 fed by pipe 93 so that the spray heads 92 are outside the path of rotation of the blades 82. A further inlet 94 is positioned about half way along the mixing chamber 81 and has its outlet 95 adjacent to the blades 85 of chopper 84.

In use the apparatus of FIG. 13 is charged with the required amount of powder and optionally other additives and is operated as a dry mixer initially. When sufficient mixing time has elapsed to obtain a random mixture of particles, a granulation agent is introduced through inlets 93 and 94 and the mixing action is continued to obtain agglomerated composite particles. After addition of the granulation agent is complete, warm dry air is fed to the mixing chamber 81 through inlets 93 and 94 to dry the powder gradually as it is being agglomerated, limiting the size of the composite particles formed.

Figure 14:
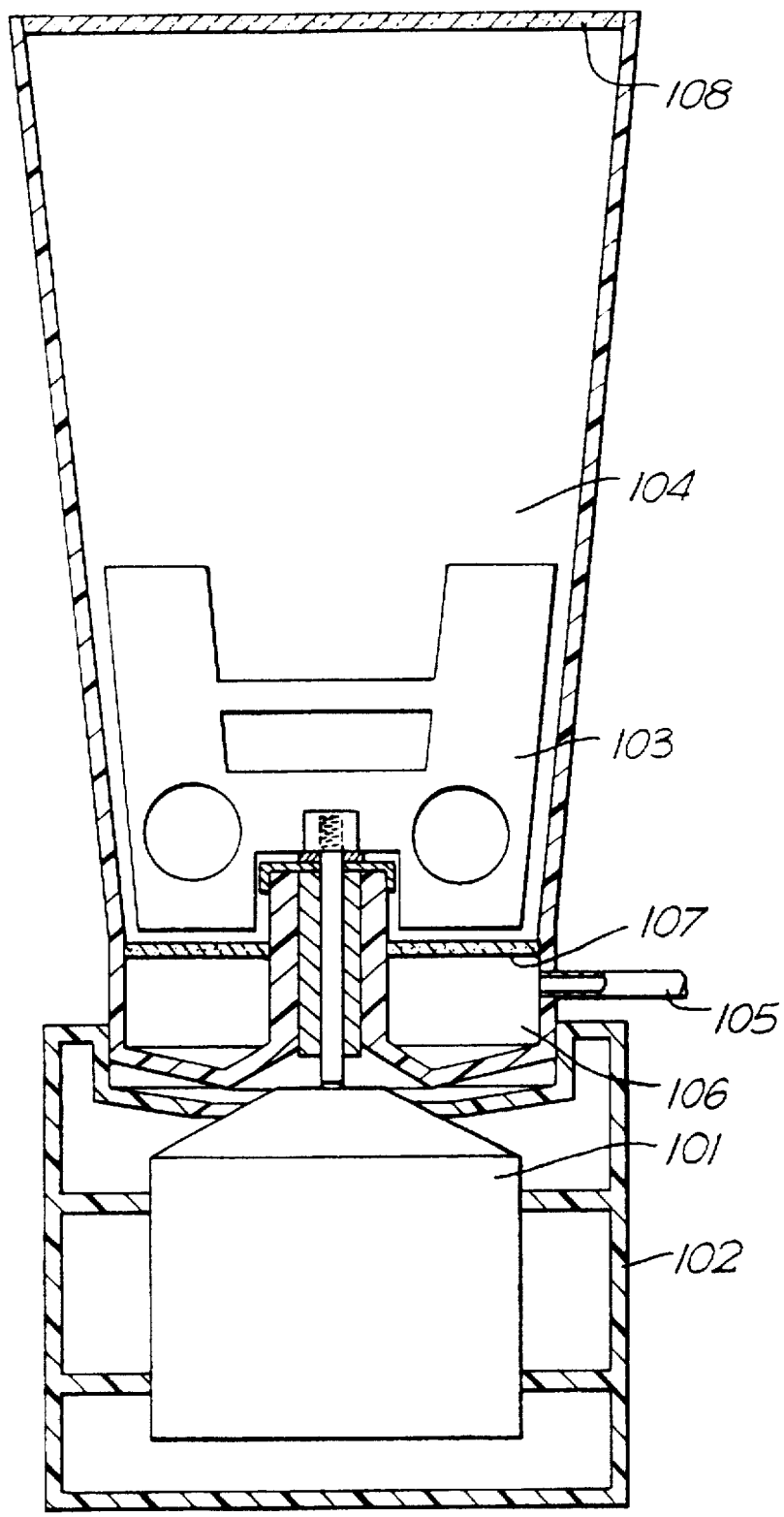
FIG. 14 is a diagrammatic cross-section of an apparatus for mixing and/or granulating film-forming and other components.

The apparatus of FIG. 14 is a modified 'Kenwood A516/517' (Trade Mark) food mixer and comprises a motor 101, contained in a housing 102, which drives a stirrer blade 103 within a mixing chamber 104. An air inlet 105 leads to an inlet chamber 106, separated from the mixing chamber 104 by a glass sinter 107. High-velocity air can be fed to the inlet 105 to fluidise the powdered material in chamber 104 and warm air can be fed to cause drying during granulation. The product is prevented from escaping during mixing or granulation by a second sintered screen 108 which separates product from exhaust air.

The following Examples illustrate the invention.

EXAMPLES

Hydraulic Press Method for Agglomeration

Agglomeration of particles is achieved by the combination of pressure and temperature.

Apparatus

Moulinex Blender

Moore Hydraulic Press

Steel Press Mould

Moulinex Coffee Grinder

Endecotts 106 Micron Laboratory Test Sieve

Procedure

The appropriate samples are obtained in the desired ratios. Mixing is achieved by two fifteen second runs in a Moulinex blender with scrape-down of the blender's sides between runs. The mixed sample is then transferred to the hydraulic press.

The top and bottom heating plates have a temperature setting of 80° C. The press mould is held between these plates for 45 minutes to allow it to equilibrate from room temperature. Once equilibrated, the bottom half of the mould is lowered to allow the sample to be inserted. Between the sample and the press mould a thin film of non-stick material (PTFE film) is placed to prevent sample adhesion to the mould. The sample is then placed in the centre of the mould and covered with another non-stick film.

The press mould is then closed and the hydraulic loading is, as swiftly as possible, increased to 20 Tons. This maximum loading is maintained for 30 seconds before being released and the agglomerated sample removed from between the non-stick layers.

The range in applied pressures is $3 \times 10^6$ to $7 \times 10^6$ $NM^{-2}$.

The press mould should be closed and allowed to re-equilibrate for 10 minutes prior to re-use.

The agglomerated sample has the form of a flat, circular cake. This is micronised by insertion into a Moulinex Coffee Grinder for approximately 20–40 seconds.

The micronised powder is then sieved through an Endecotts 106 μm laboratory test sieve and collected. The final powder generally has a particle size distribution of 90% <120 μm and no more than 10% <10 μm.

Assessment Method for Electrostatic Separation

An assessment technique for the degree of separation in an agglomerated sample and its dry-blended equivalent is listed below.

Apparatus

Volstatic electrostatic gun

Extracted spray booth

Stoving oven (min. 60 cm width)

Procedure

A 58×10 cm steel panel is degreased with xylene and wiped dry. This is suspended horizontally by metal clips within the extracted spray booth. The Volstatic gun conditions are set at Applied Voltage 60 Kv, air pressure 12 lb/in². 40 g of sample are inserted into the hopper feed to the gun and the end of the gun barrel positioned exactly 20 cm from the centrepoint of the panel. The gun is steadied and activated until all the powder has been applied across one face of the panel without movement of the gun and the panel is placed in the Stoving Oven for the appropriate cure schedule.

Assessment

As the gun is held static during application the film across the panel represents a cross-section of the powder cloud. By studying the variation of specific properties across the panel any segregation of differing particle types is measured. The chosen property to be studied depends on the sample constituents; for example, a matting filler which segregates from the powder would cause a variation in the gloss level across the panel.

A quantitative analysis of the extent of separation is not possible because of differences in film thickness across the panels caused by the static central position of the gun. The film thickness differences may have an underlying influence on the absolute values but can be removed from the overall separation conclusion by comparison of more than one panel.

In the following Examples the following products were used in the film-forming components:

Cross-linking Agents
  for polyesters: TGIC PT810 (Ciba-Geigy)
  for acrylics: dodecadonic acid (Hüls)
Flow Aids/Flow Aid Masterbatches
  Uralac P3188 (carboxy-functional polyester resin containing 10% w/w of Acronal 4F flow aid) (DSM)
  Uralac 2518 (DSM)
  Modarez III (Protex-France)
Catalysts/Catalyst Masterbatches
  Curezol C17Z M/B (carboxy-functional polyester resin containing 10% w/w of Curazole C17Z imidazole-based catalyst) (Inhouse Masterbatch from M & T Chemicals) proprietary catalyst Zinc stearate A (Durham Chemicals)
Waxes
  Worlee ADD1200 (micronised synthetic wax surface property modifier) (Worlee-Chemie GmbH)
  Carnauba wax (Industrial Waxes)
  AC8A Wax (polyethylene wax) (Allied Chemicals)
Benzoin (degassing agent) (SNIA UK)
Blanc fixe (extender) (Manchem Ltd.)
Pigments
  Bayferrox 3950 (Bayer)
  Red Oxide 130BM (Bayer)
  Carbon black BP1300 (Cabot/Tennent Group)
  Black pearls 1300 bulk use (Cabot/Tennent Group)
  Ti-pure R960 (Du Pont)
  Tiona RCL472 (SCM Chemicals)
  Heucosin Fast Blue G1737 (Heubach Chemicals)
TS100 silica (Aerosil) (Degussa)
Xylene (cleaning solvent) (Shell Chemicals)

In the Examples the Buss extruder speed settings correspond to the following actual screw speeds

| | | |
|---|---|---|
| setting | 7–75 rpm | |
| | 8–85 rpm | |
| | 9–93 rpm | |

The feeder for the Gueso M100 jet-mill was an ACCURATGE feeder 310 Model supplied by March Systems Limited.

Example 1

Additions of High Levels of Catalyst

The catalyst triphenylphosphine (TPP) (supplier M & T Chemicals) supplied in chip form was prepared for use by coffee grinding using a Moulinex grinder, sieving to <106 μm and jet milling using a Gueso M100 mill, micronising air 8 bar, feed air 1.5 bar. The particle size distribution of the jet-milled catalyst was 99% <7.9 μm, with a mean particle size of 3 μm.

All formulations produced were based on the white polyester/TGIC uncatalysed system detailed below:

| Base Formulation | % by Wt. |
|---|---|
| Carboxy-functional polyester (acid value 39–41) | 55.31 |
| Triglycidylisocyanurate (TGIC) | 6.895 |
| Titanium dioxide pigment | 30.00 |
| Benzoin | 0.3 |
| Flow Aid (Uralac 2518) | 7.5 |
| | 100% |

The above formulation has a 1:1 stoichiometry.
Three extruded compositions were produced.
 1) Base formulation (as described).
 2) Base formulation+0.2% TPP (by wt. of total composition).
 3) Base formulation+0.5% TPP (by wt. of total composition).

Manufacture was carried out by extruding each composition using a Buss (RLK46) extruder (set temperature 140° C., screw speed 7), kibbling the extrudate into chip form, grinding the chip using a Moulinex coffee grinder, and finally sieving through a 106 μm mesh.

Five agglomerated compositions were produced:
 4) Base formulation.
 5) Base formulation+0.2% TPP (by wt. of total composition)
 6) Base formulation+0.5% TPP (by wt. of total composition)
 7) Base formulation+1.0% TPP (by wt. of total composition)
 8) Base formulation+2.0% TPP (by wt. of total composition)

For each agglomerated composition 4 to 8, manufacture of the base formulation was carried out by extruding and kibbling as for composition (1) above, and the chip was then milled using a condux mill, and subsequently jet-milled using a Gueso mill (M100) with a micronising air setting 8 bar and feed air 1–5 bar. The particle size distribution (by weight) of the base formulation was 99% <16 μm.

Portions of the jet-milled base formulations were dry blend mixed with the indicated portions of jet-milled TPP, and the dry blend mixtures of the powder and catalyst were agglomerated using the hydraulic press agglomeration method described above. The resultant plates of material were ground using a Moulinex coffee grinder and sieved through a 106 μm mesh.

All 8 powder samples were assessed for their gel time at 200° C. The results were as follows:

| % Weight of TPP used | Extruded | Agglomerated |
|---|---|---|
| 0 | >840 secs | >840 secs |
| 0.2 | 134 secs | 157 secs |
| 0.5 | 58 secs | 94 secs |
| 1.0 | — | 66 secs |
| 2.0 | — | 37 secs |

Those systems with higher than normal levels of catalyst addition (e.g. compositions 7 and 8) showed satisfactory mechanical properties and give the option of faster bake systems. Such levels of catalyst addition were not possible for the extruded compositions.

The extruder used in this experiment was a single screw extruder which was flood fed and temperature was set at 240° C. Available data shows that the residence time of the material in the extruder ranges from 40 to 125 seconds, with the modal residence time being approximately 55 secs. This data in combination with gel time data illustrates why high level catalyst systems cannot be extruded without significant pre-reaction occurring in the extruder.

Example 2

Low Friction Coatings

The friction-reducing additive, a wax, Du Pont PFA (Trade Mark) (perfluoroalkoxy) powder 532–5010 having a mean particle size: ≈30 µm, with 99% <90 µm was used as supplied.

This material was added to the clear powder coating system below:

|  | % bt wt. |
| --- | --- |
| Carboxy-functional polyester (acid value 32–36) | 51.92 |
| TGIC | 6.88 |
| Uralac P3188 (Flow aid masterbatch) | 10.00 |
| Benzoin | 0.3 |
| Carnauba Wax | 0.3 |
| Catalyst masterbatch (Curezol C172) | 0.6 |
|  | 100% by wt. |

Four compositions were tested.

1) Clear formulation (normal particle size).
2) Dry blend: clear formulation+20% (by wt. of total composition) PFA
3) Co-extruded: clear formulation+20% (by wt. of total composition) PFA
4) Fused agglomerate: clear formulation+20% (by wt. of total composition) PFA Composition (1) was manufactured by premixing in a Baker Perkins apparatus for 90 secs; extruding on a Buss (PLK46) extruder (screw speed 12, barrel temp. 140° C. (set)); kibbling in a Baker Perkins apparatus; micronising on an ACM3 mill (rotor speed 10900, classifier speed 3600, feed rate 2.5); and finally sieving through a 150 µm mesh. The particle size distribution of the clear formulation after sieving was 99% by weight <104 µm, with a mean particle size of 32–40 µm.

Composition (2) was prepared by adding the wax to the clear formulation and shaking to mix the components.

In the case of composition (3), the wax was added to the formulation before pre-mixing and co-extruded using the Buss extruder (PLK46) at a set temperature of 140° C. and screw speed 8, and the extrudate was micronised by coffee grinding (Moulinex) and sieved through a 106 µm sieve.

In the case of composition (4), the clear component prepared as for composition 1 after sieving was micronised to give a particle distribution of 99% <10 µm with a mean particle size of 4 to 6 µm, and the wax was added to the clear component by solvent agglomeration using 22 g of methanol added over 6 mins, and a speed of approximately 300 rpm. During the addition of methanol (BDH Analar), dry compressed air was passed over the sample at approximately 1 liter/min, and after the addition dry compressed air was passed at 15 liters/min for 15 mins. Then the sample was dried for a further 10 mins. before spraying.

After drying, the sample was free-flowing and fluidisable, and suitable for electrostatic spraying (only 11% <10 µm). The particle size distribution (by weight) was 99% <87 µm with a mean particle size 28–37 µm.

All compositions were applied using standard powder electrostatic spray apparatus (applied voltage 70 Kv). The substrate was degreased untreated cold rolled steel (gauge 1 mm) panels of approximately 4"×22". Stoving was for 15 mins at 200° C. (total stoving time).

The coefficient of sliding friction was measured using the Ministry of Defence test method DEF STAN 80-73/1 for non-slip deck coatings, using the rubber surface and measuring the coefficient only on the dry surface. The coefficient of friction of composition 4 was found to be half that of composition 1, showing that addition of PFA powder by the agglomeration method described successfully reduced the co-efficient of sliding friction in the finished film.

Some reduction in coefficient of sliding friction was also obtained with compositions 2 and 3 (i.e. by dry-blend and extrusion methods).

Example 3

Incorporation of Rubber Tougheners

A rubber toughener (Paraloid KH3345 (Trade Mark), ex Rohm & Haas), supplied particle size 98% <170 µm and mean particle size 90–104 µm was sieved through a 32 µm mesh to give a particle size 94% <37 µm and mean particle size 21–28 µm.

The rubber toughener was added to a clear polyester/TGIC system with the following formulation:

|  | % by wt. |
| --- | --- |
| Carboxy-functional polyester resin (acid value 35) | 91.7 |
| TGIC | 6.9 |
| Benzoin | 0.4 |
| Flow Agent | 1.0 |
|  | 100% |

Three compositions were manufactured:

1) Clear formulation (as described above).
2) Co-extruded composition: clear formulation+15% (by weight of total composition) rubber toughener.
3) Fused agglomerate: clear formulation+15% (by weight of total composition) rubber toughener Compositions (1) and (2) were manufactured by extruding on a Buss (PLK46) extruder at temperature 140° C. and screw speed 7, kibbling the extrudate into chip form, grinding the chip using a Moulinex coffee grinder, and sieving through a 106 µm mesh.

In the case of composition (3), the clear component was manufactured by the extrusion, kibbling and grinding steps described above, and then jet milled using a Gueso jet mill M100 with micronising air set at 8 bar and feed air set at 1.5 bar. The rubber toughener was added to the jet-milled powder and this sample was agglomerated by a solvent agglomeration method. 15 g of methanol (Analar ex. BDH) being used with 100 g of jet-milled powder/rubber toughener.

All three compositions were applied using standard powder electrostatic spray apparatus (applied voltage 70 Kv) to a Bonderite 711 Aluminium (1 mm) 6"×4" (ex Brent) substrate. All panels were stoved for 15 mins. at 200° C. (total stoving time).

The Gardener weight impact tester with a falling 1 kg weight was used to assess the impact resistance of all three formulations.

1 joule forward and reverse impacts on all three compositions showed a degree of cracking or crazing. The appearance of the rubber toughened and untoughened panels after impact was markedly different.

With composition (1) (no rubber toughener):
Forward Impact (Impact Directly onto Coating Surface)
  The failure consisted of a series of continuous concentric circles throughout impact.
Reverse Impact (Impact onto Uncoated Side of Panel)
  The failure consisted of continuous radial lines of failure covering the whole impact area.

With compositions 2 and 3 (15% rubber toughener extruded and agglomerated respectively):
Reverse Impact
  Impact resulted in discontinuous cracking with a degree of stress whitening which did not cover the whole impact area.
Forward Impact
  Impact resulted in short lines of failure encircling the impact area. Unlike composition (1), these lines of failure did not form continuous concentric circles.

It was demonstrated that addition of rubber toughener caused the nature of the impact failure to change: the rubber toughener reduced the extent of cracking and the lengths of the cracks.

Example 4

Gloss Reduction by Incorporation of an Incompatible Resin Component (a) First Example

|  | % by Wt. |
|---|---|
| Component A (white, polyester) | |
| Carboxy-functional polyester (acid value 29) | 45.65 |
| Uralac P3188 flow aid master batch | 7.34 |
| TGIC | 3.42 |
| Pigment: Ti-Pure R960 | 15.84 |
| Pigment: Tiona RCL472 | 10.56 |
| Ac8A Wax | 0.20 |
| Benzoin | 0.50 |
| ADD.1200 Wax | 0.50 |
| Catalyst (zinc stearate A) | 0.12 |
| Filler (Blanc Fixe) | 15.87 |
| Component B (clear, acrylic) | |
| Glycidyl-functional polyacrylate | 82.00 |
| Dodecanedioic acid | 16.70 |
| Benzoin | 0.30 |
| Flow aid (Modarez III) | 1.00 |

The pre-mixes A and B were each extruded on a Buss PLK46 extruder, screw speed 80 rpm, temperature setting 140° C. The extrudates were then micronised on a Kek mill and sieved through a 106 μm steel mesh sieve. Both materials were then jet-milled using a Gueso M100 machine operating at the following set conditions: air supply 9 bar, micronising air supply 9 bar, feed air supply 1 bar, material feed rate 70. The particle size distributions obtained were as follows:

| Component A (Polyester) | | Component B (Acrylic) | |
|---|---|---|---|
| 99% below | 25 μm | 99% below | 25 μm |
| mean | 6 μm | mean | 3 μm |

For comparison a powder was also prepared by co-extruding the components A and B in a 85/15 ratio and using otherwise identical procedures.

Components A and B were agglomerated in the ratios 90/10 and 85/15 w/w by the hydraulic press method described above. This produced free-flowing and fluidisable powders with a particle size distribution 90% below 120 μm and means of 30–35 μm, with no more than 10% below 10 μm.

The agglomerated powders were applied by standard electrostatic application techniques using 70 Kv applied voltage and stoved for a total of 15 minutes at 200° C. in an electric box oven on a 6'×4'×1 mm chromate pretreated aluminium panel (Ardrox Pyrene—Bonderite 711) substrate.

Assessment of the cured films (of 50 μm dry film thickness) for gloss, impact resistance and flexibility on the T bend test gave the following results:

Gloss (Recorded at 20°, 60° and 86° C. using a Labor Reflektometer)

| | 90/10 Agglomerate | 85/15 Agglomerate | 85/15 Extrudate |
|---|---|---|---|
| Gloss (recorded at 20°, 60° and 86° C. using a Labor Reflecktometer) | | | |
| 20° | 4% | 2% | 31% |
| 60° | 10% | 6% | 77% |
| 86° | 16% | 8% | 93% |
| Mechanicals | | | |
| Impact R | 5 J | 2.5 J | 2.5 J |
| Flexibility | 1 T | 2 T | — |

The figures for impact resistance should be compared with figures for the single component systems which are generally 1 J or less for the acrylic and 10 J or greater for the polyester. The results in the T bend test for flexibility show good results with the 85/15 agglomerate and very good results for the 90/10 agglomerate.

A segregation test was carried out on the 85/15 agglomerated composition and on a 85/15 dry blend composition ('normal' particle size distribution) according to the electrostatic separation method described above.

The 60° gloss showed an even 6% test result across the panel sprayed with agglomerated material, while a spread of between 7 and 30% was obtained for the dry blend material. This demonstrated that no segregation occurred in the agglomerated material, whereas the dry blend separated to some extent on spraying, giving areas rich in either material and therefore gloss variation across the sprayed panel.

(b) Second Example

Component A was a standard white gloss polyester crosslinked with TGIC.

Component B was jet-milled acrylic powder produced as described below.

| Composition | Weight (kg) |
|---|---|
| Methyl methacrylate | 1.20 |
| Glycidyl methacrylate | 0.50 |
| 2-ethyl hexylacrylate | 0.30 |
| Triganox 21 (peroxide initiator) | 0.03 |
| Xylol | 2.00 |

The xylol was heated to reflux and the methacrylate and hexylacrylate materials and 0.025 kg of Triganox initiator were added over a period of two hours while refluxing. Refluxing was continued for a further one hour, and a further 0.005 kg of triganox initiator were then added, and refluxing was continued for another hour. The solvent was distilled off and any remaining was then vacuum stripped from the product at below 180° C. The product had viscosity 140 Poise (ICI cone and plate) at 200° C., equivalent weight 568, number average molecular weight 9900 and weight average molecular weight 24000.

Acrylic Powder Manufacture

The acrylic powder was incorporated into a simple powder coating formulation according to the proportions shown below.

|  | % by wt. |
| --- | --- |
| Acrylic polymer | 73 |
| Dodecanoic acid | 15 |
| Flow aid (Modarez III) | 1 |
| Benzoin | 1 |
| Filler (Blanc fixe) | 10 |

The above formulation was mixed in a high intensity mixer and extruded on an MPC30 twin screw extruder. (The set temperature was 125° C., screw speed 400 rpm, torque 60%, feed rate 250). The resultant chip was milled (condux mill) and sieved through a 250 micron mesh. This powder was further size-reduced using a Gueso M100 jet mill (micronising air 9 bar, feed air 1 bar).

A Henschel mixer, modified to incorporate a heating jacket, a cooling jacket, scraper blades for the internal wall and inside of the lid, and an air swept bearing for the main rotor, was used for agglomeration.

The agglomeration as carried out as follows: the temperature was set at 72° C., the mixer speed at 2000 rpm for the first minute and then 800 rpm for the remainder of the process. The machine was charged with 2 kg of a 95:5 mix of polyester:acrylic powder. The run time was 30 minutes.

Particle sizes of the starting materials (separately and mixed) and the finished product were determined using a Galai CIS-1 particle sizer. These are presented as evidence of agglomeration.

| Size, μm | Polyester Powder | Acrylic Powder | Mixture (95:5) | Finished Product |
| --- | --- | --- | --- | --- |
| Mean | 56.0 | 4.7 | 4.4 | 62.5 |
| % Vol. <5 μm | 0.56 | 63.9 | 3.4 | 0.75 |
| % Vol. <10 μm | 1.93 | 99.1 | 7.9 | 1.6 |

A sprayed and cured panel had the following gloss measurements:

| At observation angle | 20° | 60° | 85° |
| --- | --- | --- | --- |
| gloss (%) finished product | 2% | 5 | 4 |

The reduction of <5 μm and <10 μm fractions in the Henschel process are good evidence for agglomeration. The excellent matting effect of the acrylic is shown by the gloss measurements. Whereas the finished product sprayed normally during application, the dry mixture behaved as a cohesive powder (clumping, spitting from the gun, uneven powder cloud density).

Example 5

Production of Speckled Finishes

An agglomerate was prepared from two coloured polyester/TGIC powders (a blue and a white), the white powder having the composition of component A described in Example 4(a), and the blue powder being composed as follows:

|  | % by Wt. |
| --- | --- |
| Carboxy-functional polyester (acid value 29) | 27.70 |
| TGIC | 4.50 |
| Carboxy-functional polyester (acid value 30–37) | 22.16 |
| Uralac P3188 flow aid masterbatch | 11.08 |
| Aca8 Wax | 0.30 |
| Benzoin | 0.20 |
| Pigment: RTC3O (TiO2 piqment) | 0.82 |
| Pigment: Heucosin Fast Blue G1737 | 22.16 |
| Filler (Blanc Fixe) | 11.08 |

The pre-mixes for the blue and white powders were each separately extruded on a Buss PLK46 extruder at a temperature setting of 140° C. and screw speed 9. The resulting extrudates were kibbled and micronised by a Kek mill and sieved through 106 μm mesh to give in each case a mean particle size of 30–35 μm and distribution of 99% <120 μm and no more than 10% <10 μm.

The two powders were combined in a ratio of 1:1 by weight by the hydraulic press method described above. A free-flowing and fluidisable powder of mean particle size of 30–35 μm with distribution of 90% <120 μm and no more than 10% <10 μm was produced.

The powder was applied by normal electrostatic spray methods and stoved for 15 minutes at 200° C. on aluminium Bonderite 711 panels. The films produced had a uniform heterogeneity in colour, i.e. the degree of speckling was constant across the panel; this was measurable by the Cielab Colour Computer. The flow and levelling and gloss levels remained unchanged as compared with single-coloured panels.

A segregation test was conducted by the electrostatic separation method described above. By colour measurement across the width of the panel any segregation can be witnessed. A dry-blended mixture of the same coloured particles resulted in considerable segregation across the panel, whereas the agglomerated mixture of the same particles showed no significant segregation.

Example 6

(a) First Example
Colour Correction

Three colour components ("colour bases") were prepared using the following pigments 1) Bayferrox 3950 Yellow Iron Oxide
2) Synthetic Micronised Red Oxide Grade 130BM
3) Carbon Black High Colour B.P.1300 Type

| 1) Bayferrox 3950 Base | % by wt. |
| --- | --- |
| Carboxy-functional polyester (acid value 32–36) | 66.58 |
| TGIC | 5.73 |
| Uralac P3188 flow aid masterbatch | 10.00 |
| Carnauba Wax | 0.30 |
| Catalyst Masterbatch (Curazol C17Z) | 0.30 |
| Bayferrox 3950 pigment | 6.48 |
| Filler (Blanc Fixe) | 10.00 |

Extrusion was carried out in a Buss PLK46 extruder at a temperature setting of 140° C. and screw speed 9; micronising was carried out by a Kek mill apparatus. After jet-milling using a Gueso M100 apparatus under a feed air pressure of 0.5 bar, a feed rate of 70 and a micronising air pressure of 8–10 bar, the powder product had a particle size distribution of 99% <8 μm and a mean particle size of 3.4 μm.

| 2) Synthetic Micronised Red Oxide 130 BM Base | % by wt. |
| --- | --- |
| Carboxy-functional polyester (acid value 32–36) | 71.88 |
| TGIC | 6.13 |
| Uralac P3188 | 10.00 |
| Carnauba Wax | 0.30 |
| Benzoin | 0.30 |
| Catalyst (Curazole C17Z) Masterbatch | 0.60 |
| Red Oxide 130BM pigment | 5.79 |
| Filler (Blanc Fixe) | 5.00 |

Manufacture was identical to that described for the Bayferrox 3950 base (1) above. The produced powder had a particle size distribution of 99% <8 μm and a mean particle size of 3.9 μm.

| 3) Carbon Black High Colour BP1300 Type Base | % by wt. |
| --- | --- |
| Carboxy-functional polyester (acid value 32–36) | 67.88 |
| TGIC | 5.83 |
| Uralac P3188 | 10.00 |
| Carnauba Wax | 0.30 |
| Benzoin | 0.30 |
| Catalyst Masterbatch (Curazole C17Z) | 0.60 |
| Carbon Black BP1300 pigment | 3.09 |
| Filler (Blanc Fixe) | 12.00 |

Manufacture was as described in (1) above, except that a screw speed 8 was used in extrusion. The produced powder had a particle size distribution of 99% <8 μm and a mean particle of 3.5 μm.

The colour bases were then added to a conventionally-sized powder coating composition which was slightly off-shade from the desired colour. Calculations using a colour computer gave the amounts of each of the pigments required to achieve colour correction.

Agglomeration was carried out by the hydraulic press method described above. The resultant free-flowing and fluidisable powder had a particle size distribution of 90% <120 μm and no more than 10% <10 μm.

For comparison purposes, the three pigments were used also in a dry pigment addition technique.

The agglomerate was applied by normal electrostatic spray methods and stoved for 15 minutes at 200° C. on aluminium Bonderite 711 panels.

Both correction additive types lead to the colour meeting the specification. The colour bases addition, however, gave a more accurate correction than the dry pigments addition. Close inspection (<15 cm) of the dry pigment-corrected film showed a degree of inhomogeneity where areas of varying colours could be just distinguished with the naked eye. This was not seen in the colour base correction. There was no significant variation in flow and levelling caused by increased solids:binder ratio of the films.

(b) Second Example

Manufacture of Components

A polyester powder of normal particle size distribution was produced by standard methods.

A second polyester component was produced as follows:

| | % by wt. |
| --- | --- |
| Polyester polymer | 76.15 |
| Triglycidyl isocyanurate (TGIC) | 5.7 |
| Scarlet chrome sicoimin red pigment | 16.5 |
| Benzoin | 0.3 |
| Acrylate flow aid | 1.0 |
| Catalyst | 0.05 |

The ingredients were mixed in a high intensity mixer prior to extrusion through a BUSS PR46 Kno-Kneader extruder set at a barrel temperature of 140° C. and screw speed of 8. The chip was ground and sieved to below 250 μm before being micronised to 90% by vol. <10 μm particle size in a Gueso M.100 jet-mill (micronising air pressure between 8–10 bar, feed air pressure=1 bar and powder feed rating=70).

Agglomeration Conditions 2 kg of a 95:5 by weight mix of normal particle size distribution white polyester:jet-milled orange polyester powder was charged into the modified Henschel apparatus of Example 4b. Conditions in the apparatus were Jacket Temperature Setting of 65°–68° C. and speed of 1500 rpm for 55 minutes. The mixer speed was adjusted to 1600 rpm and the Temperature Setting increased to 70° C. for a further 20 minutes.

Evidence of Agglomeration

Panels were sprayed using a stationary electrostatic powder gun aimed at the centre of a panel. The stoved films should therefore display any separation of the powders due to non-agglomeration by way of the film colour differences at different positions on the panel. Colour computer measurements (ICS Colour Systems Micromatch 9000) were taken on the films at positions that were at the centre of the panel and at a set distance below this (125 mm).

The variance in colour between the centre position and the set position in the non-agglomerated starting mixture was compared to the variance in the agglomerated product using the same technique.

| | ΔE |
| --- | --- |
| Starting material | 4.69 |
| Product | 0.94 |

E is a measure of the variance in colour space position between two points and is calculated from:

$$\Delta E = \Delta L + \Delta A + \Delta B$$

where ΔL=variance in luminance axis, i.e. darker/lighter where ΔA=variance in green/red axis where ΔB=variance in blue/yellow axis.

Therefore the lower the value of ΔE the closer the colour is between the positions.

Particle size analyses of the starting materials and the finished product were conducted using a Galai CIS-1 particle analyser.

| Size (μm) | White Polyester | Orange Polyester | 95:5 Mix | Agglomerated Product |
| --- | --- | --- | --- | --- |
| Mean | 56.0 | 3.5 | 52.1 | 60.6 |
| % vol <5 | 0.6 | 84.0 | 2.7 | 0.4 |
| % vol <10 | 1.9 | 100.0 | 4.9 | 1.3 |

The reduction in <5 μm and <10 μm fractions indicate that such particles have been consumed in agglomeration, and the marginal increase in mean particle size is further evidence of fusion of the large white particles with the much finer tinting powder.

This resulted in a film of a colour that has been tinted away from the colour of the normal particle size base powder.

Example 7

Abrasion-resistant Coating

Calcined bauxite (300 mesh) FQ0060, an aluminium oxide with up to 12% $SiO_2$ supplied by C. E. Ramsden, with particle size 99% below 30 μm, mean size 5.8 μm was used as additive.

| Film-forming component | % by wt. |
| --- | --- |
| Carboxy-functional polyester (acid value 29) | 54.67 |
| Uralac P3188 | 10.93 |
| TGIC | 4.86 |
| ACA8 wax | 0.30 |
| Benzoin | 0.20 |
| Pigment: Black pearls 1300 bulk use | 1.70 |
| Filler (Blanc Fixe) | 27.34 |
| Addition prior to milling:- | 0.50 |
| Dry flow additive (silica agent TS100) | |

The raw materials for the film-forming component were extruded on a Buss PLK46 laboratory extruder (temperature set at 140° C., screw speed setting 9) and after addition of the silica agent micronised in a Kek mill and subsequently jet-milled using a Gueso M100 machine (feed air pressure 1 bar, micronising pressure 9 bar, feed rate 70) to give a particle size 99% below 20 μm, with mean size 4.5 μm.

Bauxite was added to the powder at 25% by weight and then processed by the hydraulic press method. The product was a free-flowing and fluidisable powder, particle size ≈90% below 120 μm, 10% below 10 μm, mean size 30–35 μm.

The agglomerated powder and the film-forming component were each applied by a standard electrostatic spraying method (applied voltage 70 Kv), to a Taber panel, cold rolled steel plate 4" square with ¼" hole centrally located, 0.04" (1 mm) thick. After 15 minutes stoving at 200° C., the abrasion resistance of the panels was determined by the standard test method for Abrasion Resistance of organic coatings by the Taber Abrader as described in ASTM D4060-84. The following test details were noted:

Room temperature 20° C.

Coating thickness approximately 60 μm

Calibrase CS-10 abrasive wheels 1000 g applied load 1000 wear cycles

The weight loss for the panel coated in film-forming powder (standard panel) and for the panel coated in agglomerate (test panel) were as follows:

Weight loss for standard panel=0.050 g

Weight loss for test panel=0.021 g

This shows that the test panel coated with the agglomerate was more significantly resistant to abrasion than the standard panel.

Example 8

Non-slip Powder Coating

Sand with a particle size 99% below 180 μm, mean size 120 μm, was dried in an oven, Kek milled and sieved through 150 μm mesh, then re-sieved through 106 μm mesh and added in a 1:1 weight ratio to the powdered film-forming component of Example 7.

The components were agglomerated by the hydraulic press method, although the powder was sieved through a 150 μm mesh instead of 106 μm mesh as indicated. The product was a free-flowing and fluidisable powder, particle size ≈99% below 180 μm, 10% below 10 μm, mean size 75 μm.

The agglomerated product and binder were each applied by standard electrostatic spraying method (applied voltage 70 Kv) to gradient panels, cold rolled steel 565 mm×100 mm×1 mm thick and stoved for 15 minutes at 200° C.

Non-slip properties were measured by a Ministry of Defence Standard test for non-slip deck coatings—DEF STAN 80/73-1 (see Example 2). Tests were carried out on a gradient panel coated with the film-forming component alone (standard panel) and a panel coated with the agglomerated sample. The "non-slip" panel could then be compared with the standard panel to determine the differences in the coefficient of static friction and the coefficient of sliding friction.

An applied load of 5.7 Kgs was used in these tests. The same values were obtained for the coefficient of static friction as for the coefficient of sliding friction, as follows:

"Standard" Panel=0.48

"Non-Slip" Panel=0.96

Clearly the "non-slip" panel offers a greater resistance to slip than the "standard" panel.

A segregation test was carried out by the electrostatic separation method. Both the "agglomerated" panel and the "dry blended" panel were inspected visually. The sand on the "agglomerated" panel was totally encapsulated by the powder coating and had adhered to the substrate, whereas the sand on the "dry blended" panel had gathered at both ends of the panel and could be brushed off. This showed that segregation had occurred in the "dry blended" panel.

Example 9

Addition of Syenex Extender (Syenex is a Trade Mark)

Experimental work has shown that wear rates on extruders processing formulations including very hard materials such as Syenex extenders are approximately twice that compared to similar particle size $CaCO_3$ and $BaSO_4$ extenders. Their use in the agglomeration process (thus avoiding extruder wear) was tested as follows:

Syenex, supplied by Elkem Nefelin in various grades as follows:

Syenex 10—99% below 8 μm, mean size 2.7 μm

Syenex 20—99% below 20 μm, mean size 5 μm

Syenex 30—99% below 30 μm, mean size 7.5 μm

Syenex 40—99% below 44 μm, mean size 10 μm was added to the powdered film-forming component of Example 7 at 5% by weight and agglomerated by the hydraulic press method. The product was a free-flowing and fluidisable powder, having a particle size of 90% below 120 μm, with 10% below 10 μm, and a mean size of 30–35 μm.

The agglomerate was applied by the standard electrostatic spraying method (applied voltage 70 Kv) to Bonderite B711 Aluminium panels for normal use and to gradient panels, cold rolled steel 565 mm×100 mm×1 mm thick for the segregation test. All panels were stoved for 15 minutes at 200° C. Gloss levels were recorded at 20° and 60° using a Labor Reflektometer. Comparison of a panel coated with the standard powder (the binder component alone) with one coated with agglomerated powder showed that Syenex reduced gloss levels, although not very greatly; the coarser the grade of Syenex the more the gloss level was reduced. Comparison of the gloss levels of "extruded" and "agglomerated" panels containing the same grade and amount of Syenex was also made; the "agglomerated" panels produced a slightly larger reduction in gloss level.

The effect of agglomeration on segregation was also tested. The "agglomerated" panel was measured for gloss level using a Labor Reflektometer in five different places and values recorded at 20° and 60°. Measurements were taken at the centre of the test panel, 3" from the centre in both directions and 6" from the centre in both directions. The same procedure was repeated for a dry-blended panel. Results showed the agglomerated panel to have fairly constant readings along its length, whereas the dry blended panel gave widely differing readings along its length, suggesting that separation occurred in the dry blended panel.

Example 10

Textured Finishes in Films by Addition of a Thermoplastic Texturing Agent

The texturing agent—cellulose acetate butyrate 5510.2 (CAB) supplied by Eggar Chemicals as powder, with a particle size distribution 100% under 188 μm, 5% under 10 μm, and a mean of 96 μm, was used as additive.

The film-forming component had the composition of the binder component in Example 7, but was prepared by extruding on a Buss PLK46 extruder, at screw speed 80 rpm and set temperature 140° C., micronising using a Kek mill, sieving using 106 μm steel mesh hand sieve, and then jet-milled using a Gueso M100 machine with the following set conditions: feed air pressure 1 bar, micronising air pressure 9 bar, feed rate 70. This gave a product with a particle size 99% below 25 μm and mean 4.5 μm.

This powder was then agglomerated with 0.2% CAB using the standard hydraulic press method described above to give a free-flowing and fluidisable powder with a particle size 99% below 120 μm, mean 30–35 μm, and no more than 10% below 10 μm. This material was suitable for application by standard electrostatic application techniques using an applied voltage of 70 Kv.

Cured films of 50 μm dry film thickness were prepared by spraying onto 6'×4×x1 mm chromate pretreated aluminium panels, Bonderite 711 (Ardrox Pyrene) and stoving for 15 minutes at 200° C. total oven time (conventional box oven).

Visual inspection indicates that the agglomerated product gives rise to a textured effect, though this is not as pronounced as for the conventionally prepared material of the same composition. However CAB is not expected to segregate from the agglomerated product on application, whereas it does from conventionally prepared products.

Example 11

Addition of a Tribocharging Additive

First component: a polyester gloss powder coating was manufactured using the following formulation:

|  | % wt. |
| --- | --- |
| Polyester polymer | 68.1 |
| TGIC | 4.6 |
| Titanium dioxide | 24.9 |
| Other pigments | 0.6 |
| Flow agent | 1.3 |
| Benzoin | 0.3 |
| Wax | 0.2 |

A powder of conventional particle size was prepared.

Second component: tribocharging additive jet-milled (77% <1 μm, 99% <4 μm by number). This component was added to the first component in an amount of 1% by weight, based on the weight of the total mixture.

The agglomeration of the tribo agent onto the powder particles was achieved using the Henschel equipment described in Example 4(b). The agglomeration conditions were as follows: temperature at 65° C., mixer speed at 2100 rpm, with 2.4 kg of powder containing 1% of tribo additive being added to the mixer. The Henschel apparatus was then run at this speed for 15 minutes, after which time the powder was quickly removed from the vessel and cooled. This sample was now ready for testing on the tribo equipment.

Other reference specimens were also prepared to test how agglomerations of this type performed in terms of its ease of friction charging with respect to identical compositions that had not undergone the same mechanical treatment. These reference samples were as follows:

1) 99% polyester powder plus 1% tribo additive added at the post-milled stage, mixed by simple vigorous shaking together in a plastic bag (thus the tribo additive was a free component).
2) 99% polyester powder plus 1% tribo additive which had been masterbatched in the polyester resin (200° C. for 30 minutes under nitrogen) prior to the preparation of the sample.
3) 99% polyester powder plus 1% tribo additive which was included in the formulation and added prior to the extrusion stage, though this would not have melted at any point in the processing, unlike the masterbatched material (extrusion takes place at typically 120° C.).
4) 100% polyester powder, a control sample.

Testing for tribocharging characteristics was carried out by measuring the charge to mass ratio of each sample on passing through a Nordsen ICAB gun. The powder sample was fed from a fluidised bed through a length of PVC tubing to the inlet of the gun at an approximate rate of 100 g/minute. Both the air pressure inside the bed and that passing into the gun was set at a constant 2 bar. Once the powder had been passed through the gun, it was separated from the air stream using a standard cyclone, which also acts to discharge fully the powder, and the build-up of electrostatic charge on the cyclone was measured and used to gauge the tribo-charging that occurred as it passed through the gun. After collection of the powder once it had been separated from the air, its mass over a known period of time was measured and a charge to mass ratio for that particular sample calculated. The sample was then returned to the fluidised bed and another run was taken. Each powder was tested a number of times until the calculated charge to mass ratios were found to stabilise well within the experimental errors of the operation which were around 5%.

Figure 15:
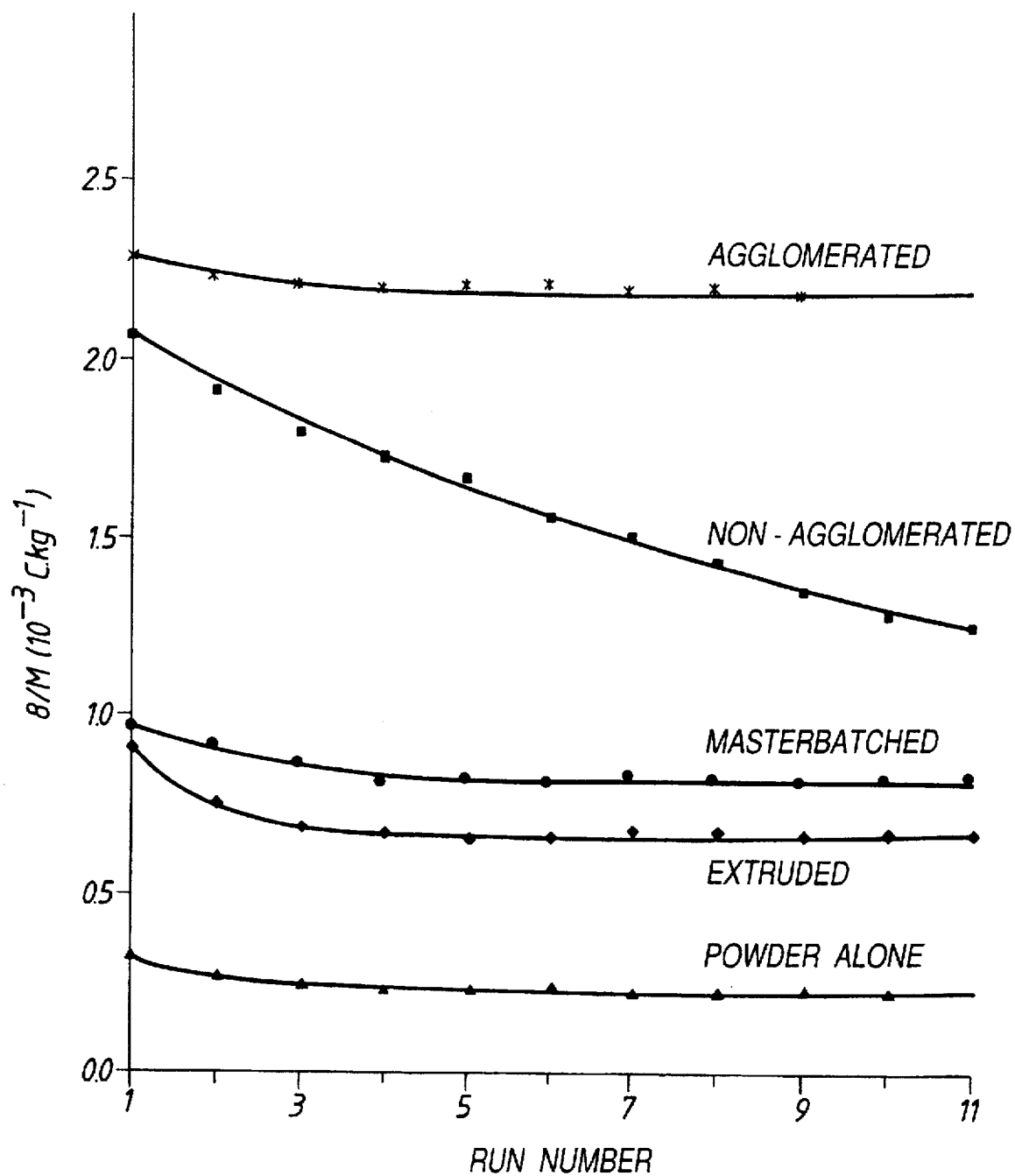
FIG. 15 is a graph of the results of tribochargeability tests for various compositions, including a non-agglomerated mixture of film-forming component plus tribocharging additive, and an agglomerated version of this mixture.

The charge to mass data collected on the various powder specimens tested on the tribo equipment is displayed in FIG. 15. It can be seen that the pure polyester powder charged significantly less than any of the other samples since the additive itself enhanced the ability of the polyester to friction charge, irrespective of the way in which it was added to the powder. Moreover, from the quite dramatic reduction in charging from reference sample (1) with run number, loss of the additive must occur during recycling, even when a highly efficient technique of recovery is employed.

Both the masterbatched and extruded samples were found to display enhanced tribo activity, but to a level which under normal circumstances would not be sufficient for satisfactory adhesion of the powder to a metallic substrate. This result appears to support the hypothesis that charge transfer is a surface phenomenon, as the charging of these samples is less than the free additive powder since much of the additive in these cases is trapped inside the particles.

The most significant improvement in the tribo characteristics of any of the samples prepared was, however, found in the agglomerated powder. This powder displayed two important characteristics; firstly, it showed a quite significant increase in its ability to tribo-charge (roughly equal to that of reference sample (1) initially), indicating that the additive was working effectively and, secondly, its magnitude of charging did not appear to diminish with run number as with reference sample (1). This second point is of great significance since it shows that the small additive particles had become physically bonded to the polyester powder and, as a result, loss of this agent during recycling occurs only at roughly the same rate as loss of the powder itself.

Example 12

Surface Segregation (Stratification)

First component: A standard high gloss white polyester was slightly reduced in size by sieving using a 53 μm sieve to give 90% by volume <53 μm.

Second component: A glycidyl-functional acrylic polymer, having equivalent weight 570, viscosity 140 Poise (200° C., ICI Cone and Plate), number average molecular weight 9900 and weight average molecular weight 24000, was granulated to chip size 3–5 mm and premixed with other ingredients of the formulation given below before extrusion using a Buss Ko-kneader, with barrel temperature set at 75° to 85° C.

|  | % by wt. |
| --- | --- |
| Acrylic polymer | 47.5 |
| Dodecanoic acid | 11.1 |
| Flow aid (Modarez) | 1.0 |
| Filler (Blanc fixe) | 39.0 |
| Violet pigment | 1.0 |
| Benzoin | 0.4 |

The extrudate was cooled and ground, then sieved to 90% by volume <53 μm.

The polyester and acrylic powders were combined in 80:20 proportions by weight and premixed using a small Moulinex mixer (product I). The composition was agglomerated into a pellet using a Moore's press (hydraulic press method described above) at 100° C. for 30 seconds. The pellet (product II) was broken into chip, ground and sieved through 106 μm mesh to yield product III.

For comparison purposes, a mixture of polyester and acrylic powders, identical to that described above, was combined by re-extrusion using a Buss Ko-kneader at 90° C. Powder was obtained from the extrudate as described above (product IV).

Resistance to segregation on application was tested using the standard test described above where powder is sprayed through a stationary gun onto a horizontally positioned panel. Panels were stoved at 180° C. for 10 minutes. Colour measurements were made at the centre and 20 cm from the centre of the panel (in a horizontal direction). Since the acrylic powder is violet and the polyester is white, colour measurement gave an indication of the composition on the panel, and colour difference across the panel can be used as a measure of segregation.

In contrast to the agglomerated powder III, the mixture of the polyester and acrylic powder (product I) showed a marked tendency to segregate during application, the polyester preferentially depositing on the centre of the panel and the acrylic tending to deposit away from the centre.

| Colour difference | |
| --- | --- |
|  | ΔE |
| Product I | 35.2 |
| Product III | 0.6 |

This clearly demonstrates that agglomeration of the two components prevents segregation during application.

The extent of surface segregation (stratification) was tested by colour measurements using a Cielab Colour Computer (10° observer D65 illuminant). The individual components and powders III and IV above were applied to a panel and stoved at 180° C. for 10 minutes before colour measurement. For product II the flat pressed pellet (that has not been subjected to a stoving treatment) was used; this represents the closest approximation to the colour generated by mixing the specified proportions of white and violet).

|  | L | a | b |
| --- | --- | --- | --- |
| White polyester | 94.8 | −1.1 | 1.52 |
| Violet acrylic | 28.5 | 13.6 | −21.2 |
| Product II | 67.4 | 13.3 | −25.6 |
| Product III | 54.6 | 23.9 | −35.3 |
| Product IV | 65.1 | 16.0 | −28.4 |

III gave a very much deeper shade than IV, and IV deeper than III.

Comparison of the colour of Product III with that of product II indicates that the acrylic component tended to migrate to the surface during film formation. Comparison of product III with product IV indicates that the migration was much more efficient where the product was manufactured by an agglomeration route, as opposed to co-extrusion of the polyester and acrylic components.

The Example provides confirmation for our view that surface segregation is promoted by having the separating components as discrete domains of substantial size before film-formation begins; in contrast surface segregation is severely retarded when components are intimately blended.

Examples 13 to 18

Colour Mixing

Example 13 a. Preparation of Individual Components

White and black colour powder coating composition bases were prepared by mixing the following formulations.

| White powder Coating Composition | |
| --- | --- |
| Rutile titanium dioxide white pigment | 250 g |
| Fillers (barytes and talc) | 200 g |
| Carboxylic acid-functional polyester resin | 268 g |
| Epoxy resin curing agent | 268 g |
| Flow modifiers | 14 g |
| Black powder Coating Composition | |
| Black pigment | 30 g |
| Fillers | 200 g |
| Carboxylic acid-functional polyester resin | 377 g |
| Epoxy resin curing agent | 377 g |
| Flow modifiers | 14 g |

The fillers, polyester resin curing agent and flow modifiers used were the same in each composition.

In each case the ingredients were dry mixed and fed to an extruder blender operating at a temperature of 100° C. The extruder produced a sheet of pigmented resin which was ground to a particle size of below 100 microns, dispersed at 35% by weight in water with 0.1% surfactant and circulated through a high-speed bead mill (Eiger mini mill) at 500 rpm in batches of 100 ml for 30 minutes each. In each case the particle size of the product was all below 10 microns, with the majority of the powder being in the size range 1 to 4 microns. The dispersions produced were dried to form the basic colour powder coating components.

b. Preparation and Use of Agglomerated Powder Coating Composition

50% by weight of the white powder coating composition and 50% by weight of the black powder coating composition were ball milled together at a concentration of 35% by weight in water containing 0.1% surfactant to form a slurry. The slurry was spray dried using an inlet air temperature of 112° C. and an exhaust temperature of 50° C.; an agglomerated composition was produced.

The spray dried powder was electrostatically sprayed onto steel panels using conventional apparatus for applying powder coatings. The coated steel sheet was stoved at 200° C. for 20 minutes. The coating produced appeared to the eye to have a uniform grey colour.

Example 14 a. Preparation of Individual Components

The process of Example 13a was repeated using the formulations listed below to prepare yellow and blue basic colour powder coating compositions. The fillers, polyester resin curing agent and flow modifiers used were the same as in Example 1.

| Yellow Powder Coating Composition | |
| --- | --- |
| "Graphitol" yellow pigment | 150 g |
| Titanium dioxide white pigment | 100 g |
| Fillers | 200 g |
| Carboxylic acid-functional polyester resin | 268 g |
| Epoxy resin curing agent | 268 g |
| Flow modifiers | 14 g |
| Blue Powder Coating Composition | |
| "Heliogen"* blue pigment | 150 g |
| Titanium dioxide white pigment | 100 g |
| Fillers | 200 g |
| Carboxylic acid-functional polyester resin | 268 g |
| Epoxy resin curing agent | 268 g |
| Flow modifiers | 14 g |

In each case the particle size of the resulting component was all below 10 microns, with the majority of the powder being in the size range 1 to 4 microns.

b. Preparation and Use of Agglomerated Powder Coating Composition

The process of Example 13b was repeated using 56% by weight of the yellow power coating composition and 44% by weight of the blue powder coating composition in place of the white and black powders. The cured powder coating appeared to the eye to have a uniform green colour.

Example 15 a. Preparation of Individual Components

White and black powder coating composition bases having the formulation given in Example 1 and of mean particle size 45 microns were each jet milled using a Gueso M100 series Jet Mill at air pressure 800 kpa and powder feed pressure 200 kpa to below 5 microns particle size. The black product had 100% below 4.8 microns and 50% by weight below 2.9 microns. The white product was 100% below 6.2 microns and 99% below 4.8 microns.

b. Preparation and Use of Agglomerated Powder Coating Composition

Figure 9:
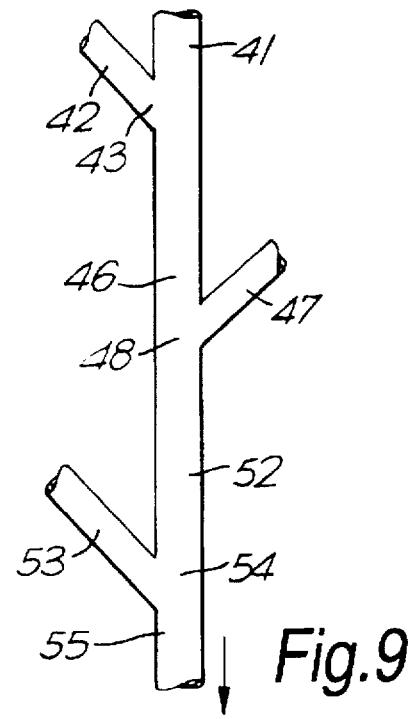
FIG. 9 is a diagrammatic section of an apparatus for mixing powdered components by electrostatic mixing.
Figure 10:
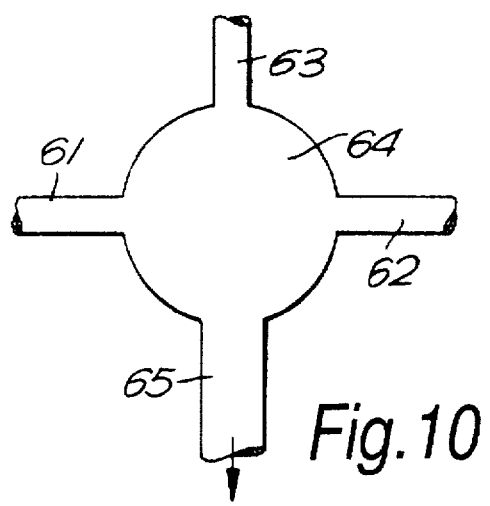
FIG. 10 is a diagrammatic section of an alternative apparatus for mixing powdered components by electrostatic mixing.

50% by weight each of the white and black powders were mixed for 10 minutes in a mixer according to FIG. 9. The powders were initially treated in a dry state until well mixed and fluidised. While the mixed powder was in fluidised form, Allied Colloids Glascol HA2 granulating agent (30% solution in water) was added from a spray head. The amount of granulating agent added was 3.0% on a dry weight basis. Mixing was continued at reduced speed for 15 minutes to cause granulation while dry air at 30° C. was fed to dry the mixture as it agglomerated. A final high-speed mixing with continued drying for 5 minutes produced an agglomerated grey powder of mean particle size 35 microns with substantially all the particles in the size range 15 to 120 microns.

The agglomerated powder was sprayed on panels and cured as described in Example 13 to produce a coating of uniform grey appearance.

Example 16 a. Preparation of Individual Components

Figure 11:
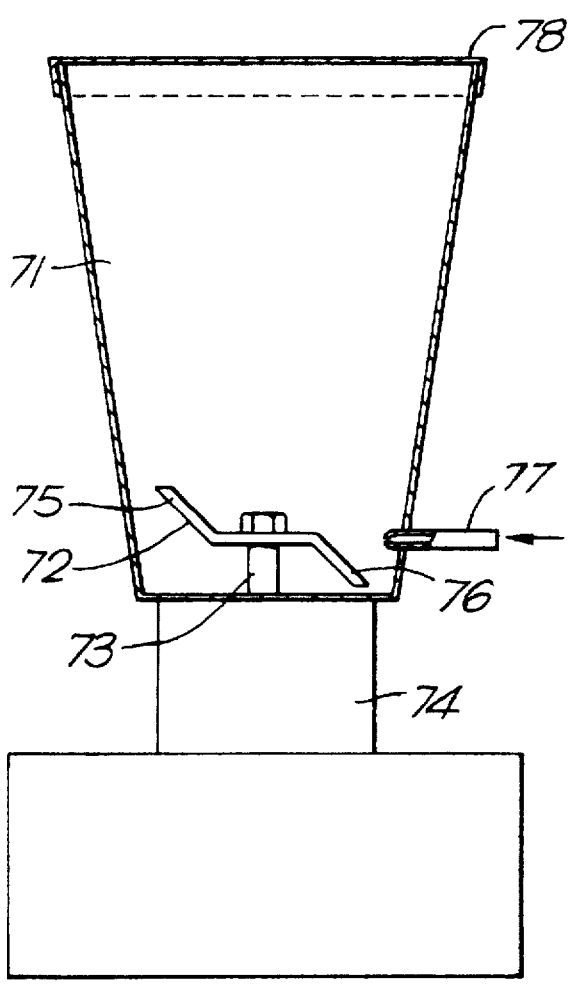
FIG. 11 is a diagrammatic section of a mixer for mechanically mixing powdered components.

The powder coating compositions, each based on a carboxy-functional polyester and an epoxy curing agent, sold by International Paint Ltd., under the Trade Marks "Interpon D White Gloss" and "Interpon D Gloss Carmine" (red) were milled in a jet mill to give basic colour powder coating compositions in which all the particles were below 4.8 microns and 50% by weight were below 2.9 microns.

b. Preparation and Use of Agglomerated Powder Coating Composition 50 g red milled powder and 50 g white were mixed in the apparatus of FIG. 11. 100 g of the mixed material was loaded into chamber 104 of the apparatus of FIG. 14. Whilst stirring at 300 rpm, 30 g of granulating agent solution (30% solids Glascol HA2) was introduced into the chamber 104 as a fine spray over 10 minutes. Mixing was maintained at a motor speed of 300 rpm while drying the product by passing dry air at 50° C. into inlet chamber 106. After 1 hour a dry free-flowing pink powder was formed. This was found to have a particle size distribution in which 50% by weight was below 48 microns, 90% by weight was below 108 microns and 94% by weight was above 15 microns.

This powder was applied to a steel substrate using an electrostatic spray gun and cured at the recommended storing schedule for "Interpon D". A smooth pink coating, homogeneous to the eye, was produced.

Example 17 a. Preparation of Individual Components

A blue component powder was prepared by the method of Example 16a from a powder coating composition "Interpon D Gloss Ultramarine" sold by International Paint Ltd. based on a carboxy-functional polyester and an epoxy curing agent. The resultant powder had all particles below 4.8 microns and 50% by weight were below 2.9 microns.

b. Preparation and Use of Agglomerated Powder Coating Composition 50 g of blue milled powder from (a) above and 50 g red milled powder from Example 16a were mixed in the apparatus of FIG. 11. The agglomeration process of Example 16b was then repeated. The particle size of the agglomerated product was similar to that of the product of Example 16 and it could be applied to a substrate and used to form a smooth, visually homogeneous, purple coating.

Example 18

Gloss Reduction of a Colour Mixed Coating by Incorporation of an Initially Compatible Component Having Different Functionality and Gel Time a. Preparation of Individual Components Colour Components White and black powder coating composition bases having the formulations given below and of mean particle size 45 microns were each milled in a jet mill to below 5 microns particle size.

| White Powder Coating Composition | |
|---|---|
| Rutile Titanium Dioxide White Pigment | 375 g |
| Filler (barytes) | 25 g |
| Carboxylic-acid functional polyester resin | 550 g |
| Hydroxyalkyl amide curing agent | 20 g |
| Flow Modifiers | 30 g |

| Black Powder Coating Composition | |
|---|---|
| Black Pigment | 50 g |
| Filler (barytes) | 125 g |
| Carboxylic-acid functional polyester resin | 750 g |
| Hydroxyalkyl amide curing agent | 28 g |
| Flow Modifiers | 47 g |

The gel time at 200° C. of these components was:

| white component | 94 seconds |
|---|---|
| black component | 91 seconds |

Following jet milling the black product had 100% below 4.8 microns and 50% by weight below 2.9 microns. The white product was 100% below 6.2 microns and 99% below 4.8 microns.

Matting Component

A matting powder coating composition, having the formulation given below and a mean particle size of 45 microns was jet milled to below 45 microns particle size.

| Matting Powder Coating Composition | |
|---|---|
| Filler (barytes) | 325 g |
| Carboxylic-acid functional polyester resin (functioality two times that of polyester resins used in coloured components) | 575 g |
| Hydroxyalkyl Amide curing agent | 65 g |
| Flow Modifiers | 35 g |

The gel time at 200° C. of this matting component was 14 seconds. Its particle size following jet milling was 100% below 45 microns and 50% by weight below 18 microns.

b. Preparation and Use of Agglomerated Powder Coating Composition 40 g of the white milled powder and 40 g of black milled powder from (a) above were mixed with 20 g of matting component from (a) above in the apparatus of FIG. 11. The agglomeration process of Example 16b was then repeated. The particle size of the agglomerated product was similar to that of Example 16. The agglomerated product could be applied to a substrate and used to form a smooth, visually homogenous, grey coating.

The 60° gloss of the resultant coating was measured (using a Labor Reflektometer) and was found to be 20%. This compares to a gloss level of >85% for the coating in Example 13.

The above Examples are summarised in the following Table.

TABLE

| Example | Size 1st film-forming compt. | Additive | Proportion of additive by wt. | Size of additive | Result | Agglomerate type |
|---|---|---|---|---|---|---|
| 1 | d | catalyst | 0.2 to 2% | d | faster gelling | III |
| 2 | d | PTFE-type | 20% | 99% < 90 μm mean 30 μm (f) | low friction | IIIA |
| 3 | d | rubber tougnener | 15% | b | improved impact resistance | IIIA |
| 4  4a | d | uncoloured | 10%; 15% | d | gloss reduction | III |

TABLE-continued

| Example | Size 1st film-forming compt. | Additive | Proportion of additive by wt. | Size of additive | Result | Agglomerate type |
|---|---|---|---|---|---|---|
| 4b | c | acrylic | 5% | | | I |
| 5 | b | differently coloured polyester | 50% | b | speckled finish | II |
| 6 6a 6b | c | differently coloured polyester | as required 5% | d | colour tinting/ correction | I |
| 7 | d | bauxite | 25% | d | abrasion resistance | III |
| 8 | d | sand | 50% | >10% ≧ 50 μm | non-slip coating | IIIA |
| 9 | d | extender Syenex 10,20 Syenex 30,40 | 5% | d | cost reduction reduced extruder wear | III |
| 10 | d | CAB | 0.2% | large - mean 96 μm | texture | IIIA |
| 11 | c | tribo-charging additive | 1% | d | tribo-charging effect retained on recycling | I |
| 12 | b | acrylic | 20% | b | stratification | II |
| 13 | d | differently coloured polyester | 50% | d | colour mixing | III |
| 14 | d | differently coloured polyester | 44% | d | colour mixing | III |
| 15 | d | differently coloured polyester | 50% | d | color mixing | III |
| 16 | d | differently coloured polyester | 50% | d | colour mixing | III |
| 17 | d | differently coloured polyester | 50% | d | colour mixing | III |
| 18 | d | i) differently coloured polyester + ii) clear, different functionality polyester | i) 40% ii) 20% | d e | colour mixing + gloss reduction | III | b = ≧90% by vol. <50 μm, >10% by vol. ≧20μm, mean 15–35 μm (fluidisable)
c = ≧10% by vol. ≧50 μm, >90% by vol. <70 μm, <70% byvol., <50 μm, mean 35–60 μm, (fluidisable)
d = ≧90% by vol. <20 μm, mean 1.5–12 μm (non-fluidisable)
e = >90% by vol. <30 μm, mean 12–18 μm
(f) = fluidisable
(nf) = not fluidisable

We claim:

1. A powder coating composition for providing a coating having certain appearance or performance attributes, which comprises composite particles that are agglomerates of individual particle components that have been fused or bonded together into composite particles which are air-fluidisable and do not break down under the mechanical and/or electrostatic forces encountered during their application to the substrate, wherein said individual particulate components, present as discrete particles within the composites, comprise a first, solid, film-forming particulate component and one or more additional, solid, particulate components that differ from said first particulate component, each particle of said first component comprising a solid polymeric binder system at least a portion of which is a film-forming resin in an amount sufficient to impart film-forming properties to the composition, the particles of said additional component(s) containing at least one substance that provides, together with said first, film-forming, component, said certain appearance or performance attribute to said coating when processed into a coating with said first component, the identities, particle sizes and proportions of the components in the composition being selected such that, when the composition is applied to a substrate and heated to form a continuous coating, a film having the certain appearance or performance attribute is formed, with the proviso that, if the additional particulate component is a metallic or lustre appearance component and said first particulate component is fluidisable, the powder coating composition also contains as discrete particles within the composites at least a non-film-forming particulate performance component or a film-forming particulate appearance or performance component that is immiscible with said first film-forming component.

2. A powder coating composition as claimed in claim 1, which includes, as said additional component(s),
   (a) a second film-forming component immiscible with said first, film-forming component or a non-film-forming polymer component, or
   (b) a non-film-forming performance additive selected from the group consisting of an impact-resistance additive, a friction-reducing additive, a reinforcement filler, a microcapsule, an abrasive material, a catalyst, a fungicide, an enzyme, an intumescent pigment, a thermochromic pigment, a tribocharging additive, and a corona-charging additive, or
   (c) a non-film-forming additive selected from the group consisting of a non-film-forming polymer roughening agent, a conventional matte-finish producing gloss-reducing agent, a filler, and an extender, or two or more of any of such components specified in (a), (b) and (c), and/or (d) in the case of a first, film-forming component that is coloured, a further, differently coloured film-forming component miscible with the first film-forming component, or two or more such components, the particle sizes of each of the film-forming components being such that when the composition is applied to a substrate and heated to form a continuous coating the differences in colour in the cured composition arising from the different coloured particles can be discerned by the human eye, or (e) in the case of a first, film-forming component that is coloured and fluidisable, a differently coloured component selected from colouring pigments and film-forming components miscible with the first film-forming component, or two or more such components, each such additional component being of such a colour and in an amount and of a particle size sufficiently small that when the composition is applied to a substrate and heated to form a continuous coating the differences in colour in the cured composition arising from the different coloured particles cannot be discerned by the human eye, or (f) in the case of a first, film-forming component that is coloured and non-fluidisable, a further, differently coloured film-forming component miscible with the first film-forming component or two or more such component and optionally an uncoloured miscible film-forming component, the size of the particles in each of the film-forming components being sufficiently low that when the powder coating is applied to a substrate and heated to form a continuous coating the differences in colour in the cured powder coating arising from the different coloured and any uncoloured particles cannot be discerned by the human eye.

3. A powder coating composition as claimed in claim 2, which includes, as said additional component (b), a second non-film-forming performance additive selected from the group consisting of an impact-resistance additive, a polytetrafluorethylene sphere, a nylon sphere, a fiber, a microcapsule, an abrasive, a catalyst, a fungicide, an enzyme, and a pigment.

4. A powder coating composition as claimed in claim 1, wherein said first, film-forming component is coloured, and which includes as additional component(s) a differently coloured film-forming component that is miscible with the first film-forming component, or two or more such components, the size of the particles in each of said film-forming components being sufficiently low that when the powder coating is applied to a substrate and heated to form a continuous coating the differences in colour in the cured powder coating arising from the different coloured particles and any uncoloured particles cannot be discerned by the human eye.

5. A powder coating composition as claimed in claim 4, which includes, as further additional component(s), one or more components selected from the group consisting of (i) a film-forming component that is immiscible with the first film-forming component or that is miscible therewith but has a different functionality, (ii) a non-film-forming polymer component, (iii) a non-film-forming performance additive selected from the group consisting of an impact-resistance additive, a polytetrafluorethylene sphere, a nylon sphere, a fiber, a microcapsule, an abrasive, a catalyst, a fungicide, an enzyme, and a pigment.

6. A powder coating composition as claimed in claim 1, which includes, as said additional component a film-forming component immiscible with the first film-forming component or a film-forming component miscible with the first film-forming component but having a different functionality, or a non-film-forming polymer component, the identity, amount and particle size of said additional component and of said first, film-forming component being such that when the powder coating is applied to a substrate and heated to form a continuous coating these components are immiscible and a matting effect is obtained.

7. A powder coating composition as claimed in claim 2, which includes, as said additional component (a), a film-forming component that is immiscible with said first film-forming component, the identity, amount and particle size of said component (a) and of said first film-forming component being such that when the powder coating is applied to a substrate and heated to form a continuous coating these two components segregate and form a multilayer system.

8. A powder coating composition as claimed in claim 1, wherein said first film-forming component is coloured, and which includes as additional component(s) a further, differently coloured miscible film-forming component, or two or more such components, the particle sizes of each of the film-forming components being such that when the composition is applied to a substrate and heated to form a continuous coating the differences in colour in the cured composition arising from the different coloured particles can be discerned by the human eye.

9. A powder coating composition as claimed in claim 1, wherein said first film-forming component is fluidisable and which includes as additional component(s) at least one component selected from the group consisting of colouring pigments and film-forming components miscible with said first film-forming component, each of said additional components being of such a colour and in an amount and of a size sufficiently small that when the composition is applied to a substrate and heated to form a continuous coating the differences in colour in the cured composition arising from the different coloured particles cannot be discerned by the human eye.

10. A powder coating composition as claimed in claim 2, which includes, as said additional component (b), a non-film-forming performance additive selected from the group consisting of a fragile additive selected from the group consisting of an impact-resistance additive, a friction-reducing additive, a reinforcement filler, and a microcapsule, an extruder-blocking or damaging additive selected from the group consisting of an abrasive material, a filler, an extender, and a catalyst, a heat-sensitive additive selected from the group consisting of a fungicide, an enzyme, an intumescent pigment, and a thermochromic pigment, and a tribocharging additive, and a corona-charging additive.

11. A powder coating composition for providing a coating having certain appearance or performance attributes, which comprises composite particles that are agglomerates of individual particulate components that have been fused or bonded together into composite particles which are air-fluidisable and do not break down under the mechanical and/or electrostatic forces encountered during their application to the substrate, wherein said individual particulate components comprise a first, solid, film-forming component and one or more additional, solid, components that differ from said first component, each particle of said first component comprising a solid polymeric binder system at least a portion of which is a film-forming resin in an amount sufficient to impart film-forming properties to the composition, the particles of said additional component(s) containing at least one substance that provides, together with said first, film-forming, component, said certain appearance or performance attribute to said coating when processed into a coating with said first component, the identities, particle sizes and proportions of the components in the composition being selected such that, when the composition is applied to a substrate and heated to form a continuous coating, a film having the certain appearance or performance attribute is formed, wherein said additional component(s) is (are) selected from the group consisting of (i) film-forming components that differ in composition and/or in particle size from said first film-forming component, (ii) non-film-forming additives selected from the group consisting of impact-resistance additives, friction-reducing additives, reinforcement fillers, microcapsules, abrasive materials, catalysts, fungicides, enzymes, intumescent pigments, and thermochromic pigments, tribocharging additives, and corona-charging additives, and (iii) non-film-forming additives selected from the group consisting of colouring pigments, roughening agents, conventional gloss-reducing agents, and fillers/extenders.

12. A powder coating composition as claimed in claim 1, wherein at least one of said first and said additional component(s) has a particle size at least 90% by volume <50 µm.

13. A powder coating composition as claimed in claim 2, wherein at least one of said additional film-forming component(s) (a), (d), (e) and (f) has a particle size of at least 90% by volume <50 µm.

14. A powder coating composition as claimed in claim 11, wherein at least one of said first and said other component(s) has a mean particle size no more than 35 µm.

15. A powder coating composition as claimed in claim 4, wherein said first film-forming component and said additional, differently coloured miscible film-forming component(s) each has a particle size at least 90% by volume <20 µm.

16. A powder coating composition as claimed in claim 6, wherein said immiscible or miscible film-forming component has a particle size at least 90% by volume <25 µm or <30 µm respectively.

17. A powder coating composition as claimed in claim 7, wherein said immiscible film-forming component has a particle size at least 90% by volume <50 µm and a mean particle size no more than 35 µm.

18. A powder coating composition as claimed in claim 8, wherein said first and said miscible film-forming component each has a particle size at least 90% by volume <50 µm, more than 10% by volume >20 µm and a mean particle size in the range of from 15 to 35 µm.

19. A powder coating composition as claimed in claim 9, wherein said pigment or miscible film-forming component has a particle size at least 90% by volume <20 µm and a mean particle size up to 12 µm.

20. A process for powder coating a substrate wherein a composition according to claim 1 is applied to the substrate and heated to form a continuous coating.

* * * * *

UNITED STATES PATENT AND TRADEMARK OFFICE
CERTIFICATE OF CORRECTION

PATENT NO.    : 5,856,378
DATED         : January 5, 1999
INVENTOR(S)   : John Ring, et al.

It is certified that error appears in the above-identified patent and that said Letters Patent is hereby corrected as shown below:

On the title page, item [75] Inventors:

Change "New Castle on Type" to --New Castle on Tyne-- for the residence of Andrew George Cordiner, Timothy Marc Handyside and John David Sinclair-Day.

Signed and Sealed this

Twenty-eighth Day of December, 1999

Attest:

Q. TODD DICKINSON

*Attesting Officer*    *Acting Commissioner of Patents and Trademarks*